United States Patent
Sakamoto et al.

(10) Patent No.: US 11,599,674 B2
(45) Date of Patent: Mar. 7, 2023

(54) INFORMATION PROCESSING APPARATUS FOR PROCESSING DATA USING PROCESSING PROGRAM BASED ON AGREEMENT INFORMATION ON PROCESSING METHOD FOR PERSONAL DATA, COMPUTER-READABLE RECORDING MEDIUM RECORDING CONTROL PROGRAM FOR PROCESSING DATA USING PROCESSING PROGRAM BASED ON AGREEMENT INFORMATION ON PROCESSING METHOD FOR PERSONAL DATA, AND CONTROL METHOD FOR PROCESSING DATA USING PROCESSING PROGRAM BASED ON AGREEMENT INFORMATION ON PROCESSING METHOD FOR PERSONAL DATA

(71) Applicant: FUJITSU LIMITED, Kawasaki (JP)

(72) Inventors: Takuya Sakamoto, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/996,953

(22) Filed: Aug. 19, 2020

(65) Prior Publication Data
US 2021/0081565 A1  Mar. 18, 2021

(30) Foreign Application Priority Data
Sep. 13, 2019 (JP) .............................. JP2019-167507

(51) Int. Cl.
*G06F 21/64* (2013.01)
*G06F 21/78* (2013.01)
(Continued)

(52) U.S. Cl.
CPC ........ *G06F 21/6254* (2013.01); *G06F 21/335* (2013.01); *G06F 21/64* (2013.01); *G06F 21/78* (2013.01)

(58) Field of Classification Search
CPC .... G06F 21/6254; G06F 21/335; G06F 21/64; G06F 21/78
(Continued)

(56) References Cited

U.S. PATENT DOCUMENTS 6,950,943 B1   9/2005  Bacha et al.
8,281,143 B1 * 10/2012  Clifford .............. H04L 63/0435
                                                        707/747
(Continued)

FOREIGN PATENT DOCUMENTS

JP   2005-025735 A   1/2005
JP   2016-085676 A   5/2016
(Continued)

OTHER PUBLICATIONS

Extended European Search Report dated Feb. 5, 2021 for corresponding European Patent Application No. 20190883.7, 7 pages.
(Continued)

*Primary Examiner* — Thanh T Le
(74) *Attorney, Agent, or Firm* — Fujitsu Patent Center

(57) ABSTRACT

An information processing apparatus includes: a memory; and a processor coupled to the memory and configured to: receive personal data related to a personal data originator; receive agreement information on a processing method for the personal data agreed between the personal data originator and a personal data user who uses the personal data; process the personal data by the processing method defined in the agreement information; and attach a digital signature to processed data and output the processed data.

17 Claims, 11 Drawing Sheets

(51) Int. Cl.
*G06F 21/62* (2013.01)
*G06F 21/33* (2013.01)
(58) Field of Classification Search
USPC .......................................................... 726/26
See application file for complete search history.

(56) References Cited

U.S. PATENT DOCUMENTS

| | | | |
|---|---|---|---|
| 8,806,190 B1* | 8/2014 | Munshi | H04L 63/0428 |
| | | | 713/153 |
| 10,410,016 B1* | 9/2019 | Damick | H04L 63/0435 |
| 2004/0254817 A1 | 12/2004 | Uzura | |
| 2006/0212713 A1* | 9/2006 | Hatakeda | G06F 21/6245 |
| | | | 713/182 |
| 2010/0319061 A1 | 12/2010 | Hatakeyama et al. | |
| 2014/0119540 A1 | 5/2014 | Pearson et al. | |
| 2015/0363609 A1* | 12/2015 | Huang | G06F 21/6218 |
| | | | 713/165 |
| 2017/0357709 A1* | 12/2017 | Tamura | G06F 16/283 |
| 2018/0091596 A1* | 3/2018 | Alvarez | H04L 67/12 |

FOREIGN PATENT DOCUMENTS

| | | |
|---|---|---|
| JP | 2018-128913 A | 8/2018 |
| JP | 2018-165951 A | 10/2018 |

OTHER PUBLICATIONS

European Office Action dated Mar. 22, 2022 for corresponding European Patent Application No. 20190883.7, 5 pages.

* cited by examiner

INFORMATION PROCESSING APPARATUS FOR PROCESSING DATA USING PROCESSING PROGRAM BASED ON AGREEMENT INFORMATION ON PROCESSING METHOD FOR PERSONAL DATA, COMPUTER-READABLE RECORDING MEDIUM RECORDING CONTROL PROGRAM FOR PROCESSING DATA USING PROCESSING PROGRAM BASED ON AGREEMENT INFORMATION ON PROCESSING METHOD FOR PERSONAL DATA, AND CONTROL METHOD FOR PROCESSING DATA USING PROCESSING PROGRAM BASED ON AGREEMENT INFORMATION ON PROCESSING METHOD FOR PERSONAL DATA

CROSS-REFERENCE TO RELATED APPLICATION

This application is based upon and claims the benefit of priority of the prior Japanese Patent Application No. 2019-167507, filed on Sep. 13, 2019, the entire contents of which are incorporated herein by reference.

FIELD

The embodiments discussed herein are related to an information processing apparatus, a control program, and a control method.

BACKGROUND

In recent years, various pieces of personal data have been collected in a cloud computer system. With the progress of the movement called the Internet of Things (IoT), more pieces of personal data tend to be collected from sensors and the like. Various services are provided based on the collected personal data.

Related art is disclosed in Japanese Laid-open Patent Publication No. 2018-128913, Japanese Laid-open Patent Publication No. 2016-85676, Japanese Laid-open Patent Publication No. 2005-25735 and U.S. Pat. No. 2004/0254817A1.

SUMMARY

According to an aspect of the embodiments, an information processing apparatus includes: a memory; and a processor coupled to the memory and configured to: receive personal data related to a personal data originator; receive agreement information on a processing method for the personal data agreed between the personal data originator and a personal data user who uses the personal data; process the personal data by the processing method defined in the agreement information; and attach a digital signature to processed data and output the processed data.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
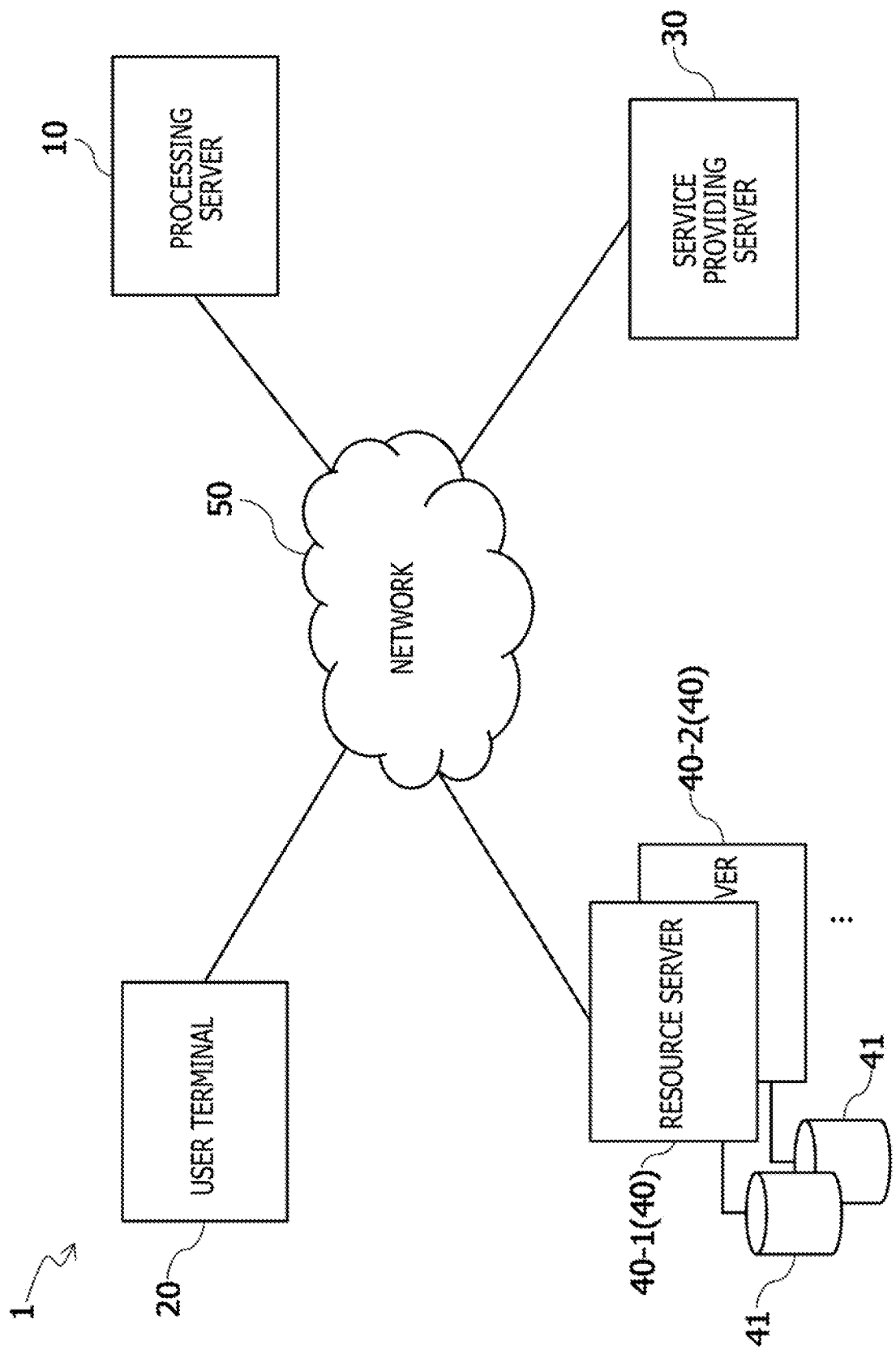
FIG. 1 is a diagram schematically illustrating a configuration of a data processing system as an example of a first embodiment.

For example, there is an idea that an individual person ought to have the right to control the collected personal data of his or hers. For example, the European Union (EU) has made a rule called General Data Protection Regulation (GDPR), in which it is obliged to make it possible, as data portability, to provide the personal data to other services.

When an individual person is able to control his or her own data, it is considered that, for example, the data may be sold to a service company by Consumer to Business (CtoB), and services on the premise that the data is provided increase in the world, so that the data utilization is extended. For example, telematics insurance that estimates an insurance premium rate based on vehicle driving data is known, and it is considered that similar services will increase in number. In the telematics insurance, for example, a travel distance, a driving characteristic of the driver, and the like are measured and transmitted by a measuring device mounted in an automobile, and the data is collected and analyzed to determine an insurance premium in accordance with an individual risk.

For example, OAuth is known as a framework for providing user data held in a certain service to another service based on the consent of the user.

There is a case in which a user is reluctant to transfer unprocessed data (hereinafter, may be referred to as raw data) to a service company or the like, and on the other hand, the data received by the service company does not have to be raw data.

In the case where the data held by a certain service company is personal data, and when it is considered to use the personal data for various services, a level of trust of the service company differs depending on the service company or the like. As such, depending on the level of trust, there is a case in which it is worrisome to transfer personal data to the service company in a state of raw data, but it is acceptable to provide the personal data after the personal data is subjected to processing such as removing some pieces of information contained therein.

For example, the case is such that, when the driving data includes not only information of the accelerator and brake states but also accurate location information, the information of the accelerator and brake states is allowed to be provided but the location information is not allowed to be provided.

On the other hand, when it is possible for the service company to provide a service by using the information even in a processed state, there is a case in which it is also possible to provide the service by using only the remaining information. For example, in the above-mentioned telematics insurance, it is possible to change the estimated result of the insurance premium rate by verifying the roughness of the driving or the like only by the information of the accelerator and brake states without the location information.

Alternatively, it may be desired to combine the driving data with other data such as age information of the driver. For example, there is a case in which a plurality of pieces of data is desired to be combined and provided since it is insufficient to provide only a single piece of data. Such data provision may be obtained in such a manner that, for example, a user processes the data of a certain service and then provides the processed data to the service.

However, when a service company that makes use of data receives data, from a user, having been processed by the user, there is a risk that the service company receives abnormal data in a case where the user uses improper data, carries out inappropriate processing on normal data, or the like.

When a user provides inappropriately processed data to a service company, it is difficult for the service company to provide a normal service by using the stated data. In addition, even when the service company knows a processing method having been performed by the user, it is not possible to determine whether proper data has been used in the processing by looking at the processed data. In a case where a user provides data based on improper data, it is also difficult for the service company to provide a proper service.

In one aspect, personal data may be effectively utilized.

Hereinafter, embodiments of the information processing apparatus, control program, and control method will be described with reference to the drawings. The following embodiments, however, are merely examples and are not intended to exclude the application of various modifications and techniques that are not dearly described in the embodiments. For example, the embodiments may be implemented in various forms (including a combination of the embodiment and each modification example) without departing from the spirit and scope of the embodiments. The drawings are not intended to indicate that only the drawn constituent elements are provided, and therefore other functions and the like may be included.

(I) Description of First Embodiment (A) Configuration

FIG. 1 is a diagram schematically illustrating a configuration of a data processing system 1 as an example of a first embodiment.

The data processing system 1 exemplified in FIG. 1 includes a service providing server 30, resource servers 40-1 and 40-2, a processing server 10, and a user terminal 20. The service providing server 30, the resource servers 40-1 and 40-2, the processing server 10, and the user terminal 20 are communicably coupled to each other via a network 50. The network 50 is, for example, a local area network (LAN). The network 50 may be a cloud network constructed by using a LAN or the like.

[Resource Server 40]

The resource servers 40-1 and 40-2 are computers having a server function. Each of the resource servers 40-1 and 40-2 includes a storage device 41. These storage devices 41 store data (personal data, user data) of a user who uses the user terminal 20 (hereinafter, simply referred to as a user). The user corresponds to an originator of user data as personal data (a personal data originator). The resource server 40 corresponds to a personal data storing unit configured to store the user data.

Hereinafter, when the two resource servers 40-1 and 40-2 are not specifically distinguished from each other, they are referred to as the resource servers 40.

A unique data source ID, which is identification information, is set in advance in each of the plurality of resource servers 40, and a specific resource server 40 may be specified from among the plurality of resource servers 40 by using the data source ID. Further, the data source ID may be represented by using a reference symbol IDr.

In the user data to be stored in the storage device 41 of the resource server 40, a data Identification (ID), which is identification information for specifying the user data, is set in advance.

By using the data source ID and the data ID, the user data stored in the resource server 40 may be uniquely specified.

When the resource server 40 receives, from the user terminal 20, an acquisition request for the user data specified by using the data source ID and the data ID, the resource server 40 reads out the user data specified by the data ID from the storage device 41 and transmits the user data to the user terminal 20, which is a transmission source of the acquisition request. Further, the resource server 40 adds the data ID of the user data and the data source ID (IDr), to the user data to be transmitted. Then, the resource server 40 adds a digital signature r using a private key of the resource server 40 to the user data, the data ID and the data source ID, and transmits the user data, the data ID, and the data source ID to the user terminal 20.

This makes it possible to suppress a situation in which the user data is forged, falsified, or the like. The addition of the digital signature r to the user data may be enabled by using various known methods, and description thereof will be omitted.

The digital signature r may include a user ID for specifying a user who is the owner of the user data, thereby making it possible to reliably ensure that the user data is data of a proper user.

In the example illustrated in FIG. 1, the two resource servers 40-1 and 40-2, and the two storage devices 41 are illustrated, but the embodiment is not limited thereto. For example, one or more than two resource servers 40 may be provided, and one or more than two storage devices 41 may be provided.

[Service Providing Server 30]

The service providing server 30 is, for example, a server computer operated by a service providing company, and provides a service by using data of a user who uses the user terminal 20. The service provider corresponds to a personal data user who uses personal data.

For example, when a service providing company provides telematics insurance, the service providing server 30 determines an insurance premium in accordance with an individual risk by analyzing driving data of the user (information on the states of the accelerator, the brake, and the like) collected by a measuring device mounted in the automobile.

The service providing server 30 may notify the user, via the user terminal 20 (a user application 200) to be described later, that a more preferable service may be provided when the user provides data about the user to the service providing company (service providing server 30).

The service providing server 30 requests user data from the user terminal 20, processes the user data sent as a reply in response to the request, and provides the service.

The user data request sent from the service providing server 30 to the user terminal 20 includes a data ID and a data source ID as information for specifying the user data being requested. The data ID and the data source ID correspond to information of unprocessed data. With the data source ID and the data ID, it is possible to identify which user data held by which data holder (resource server 40) is to be used for processing.

When requesting the user terminal 20 for user data, the service providing server 30 selects data processing programs permitted for processing the user data from among a plurality of types of data processing programs provided by the processing server 10, which will be described later, and presents the selected data processing programs to the user terminal 20. Then, the service providing server 30 prompts the user to select, from among the presented data processing programs, processing (data processing program) that the user permits to be applied to the user data.

As will be described later, a program ID for uniquely specifying a data processing program is set (numbered) in each of the plurality of types of data processing programs managed in the processing server 10. The program ID makes it possible to identify which data processing program is to be used to process the user data.

The service providing server 30 presents a plurality of program IDs as options along with the request for the user data to the user terminal 20. Hereinafter, the plurality of program IDs included in the user data request transmitted from the service providing server 30 to the user terminal 20 may be referred to as a program ID group.

For example, the service providing server 30 provides a set of a program ID group, a data source ID, and a data ID to the user terminal 20 as a request for user data.

Further, the service providing server 30 verifies a digital signature p added to the processed data received from the user terminal 20, and confirms that the data received from the user terminal 20 includes the program ID agreed by the service providing server 30 itself, the data source ID, and the data ID.

In the service providing server 30, by verifying the data source ID and the data ID added to the processed data, it is possible to recognize whether the requested user data has been received. In addition, by verifying the program ID added to the processed data, it is possible to recognize whether the data processing program permitted by the service providing server 30 itself for processing the user data has been applied to the user data. For example, in the service providing server 30, it is possible to confirm that the processed data satisfying the requested conditions has been received.

The function as the service providing server 30 may be enabled by using various known methods, and description thereof will be omitted.

[User Terminal 20]

Figure 2:
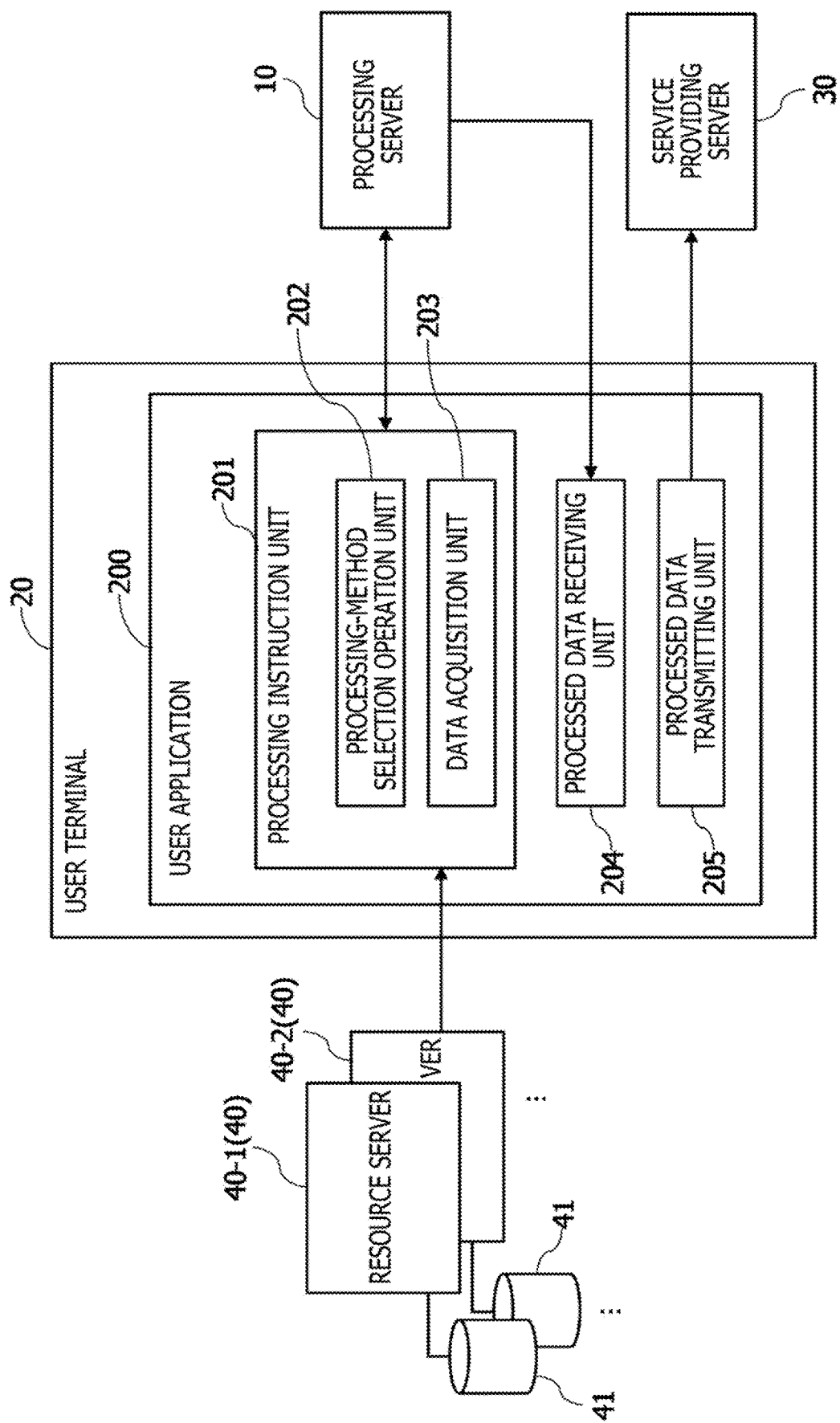
FIG. 2 is a diagram exemplifying a functional configuration of a user terminal of a data processing system as an example of the first embodiment.

FIG. 2 is a diagram exemplifying a functional configuration of the user terminal 20 of the data processing system 1 as an example of the first embodiment.

The user terminal 20 is provided with functions as a processing instruction unit 201, a processed data receiving unit 204, and a processed data transmitting unit 205. The functions as the processing instruction unit 201, the processed data receiving unit 204, and the processed data transmitting unit 205 are enabled by a processor 21 (see FIG. 11) included in the user terminal 20 executing the user application 200.

The user application 200 accesses the service providing server 30 via the network 50. Data access to the service providing server 30 may be performed via a web browser. Hereinafter, the user application 200 may be referred to as "user app 200" in some cases.

The processing instruction unit 201 instructs the processing server 10 to process the user data. The processing instruction unit 201 is provided with functions as a processing-method selection operation unit 202 and a data acquisition unit 203.

The processing-method selection operation unit 202 prompts a user to select a data processing program for processing the user data. For example, the processing-method selection operation unit 202 displays each data processing program specified by the program ID group included in the request for the user data on a monitor 24a (see FIG. 11) of the user terminal 20 as an option via a user interface. At this time, the processing-method selection operation unit 202 receives program information describing each data processing program from the processing server 10, and displays the program information in association with each data processing program.

The program information is used as reference information when the user forms agreement information, and is information indicating what processing is performed on the user data by the data processing program. The program information is created as, for example, a sentence by which the user is able to understand that some of the privacy information of the user is not included in the user data.

The processing-method selection operation unit 202 (user app 200) may ask the user whether the user data is allowed to be provided to the service providing server 30. In addition, the processing-method selection operation unit 202 may acquire program information from the processing server 10 based on the program ID and may present the acquired program information to the user, whereby the processing-method selection operation unit 202 may ask the user whether it is allowed to process the user data by the data processing programs.

The user refers to the program information displayed on the display in the user terminal 20, and selects a data processing program to be applied to the user data from among the data processing programs selected as options. Two or more data processing programs may be selected for one piece of user data.

For example, the processing-method selection operation unit 202 indicates the data processing programs that the service provider has agreed to apply to the user data requested by the service provider.

The processing-method selection operation unit 202 may allow the user to search for a character string in the program information by using a keyboard 25a, a mouse 25b, or the like (see FIG. 11) when presenting the program information to the user.

The processing instruction unit 201 notifies the processing server 10 of the program ID selected by the user. Hereinafter, the program ID selected by the user may be referred to as a program IDk.

The data acquisition unit 203 acquires user data to be processed (unprocessed data) from the resource server 40 based on the user data request received from the service providing server 30. The data acquisition unit 203 specifies the resource server 40 by the data source ID included in the user data request received from the service providing server 30. The data acquisition unit 203 requests the specified resource server 40 to transmit the user data specified by the data ID included in the user data transmission request. The user data transmission request to the resource server 40 may be made using the data ID.

Further, the data acquisition unit 203 may acquire the user data by designating, to the resource server 40, a user ID for specifying the user who is an originator of the user data. By using the user ID, the user data being requested may be easily acquired even when there exists a plurality of users.

The data acquisition unit 203 receives user data as a reply from the resource server 40 in response to the user data transmission request, and stores the received user data in a storage device (not illustrated).

In order for the data acquisition unit 203 to access the resource server 40, the user app 200 may previously include access information in which the data source IDr is associated with an address of the resource server 40. The user app 200 may acquire such access information from another server computer (a cloud server) (not illustrated) with which the user app 200 cooperates.

The processing instruction unit 201 transmits the user data received by the data acquisition unit 203 from the resource server 40, to the processing server 10. The processing instruction unit 201 notifies the processing server 10 of the user data, the data ID of the user data, the data source ID (IDr), and the program IDk as processing instruction information.

Of the processing instruction information, the data ID, the data source ID (IDr), and the program IDk correspond to the agreement information indicating the agreement content with respect to the processing of the user data by the data processing program.

The agreement information includes a combination of the data source ID (IDr) and the data ID, and the program IDk. The processing instruction unit 201 transmits the agreement information and the user data to the processing server 10.

At the time of transmitting the processing instruction information (agreement information) to the processing server 10, the processing instruction unit 201 attaches the signature r, having been transmitted from the resource server 40, to the user data, the data ID and the data source IDr, for example, and then transmits the processing instruction information to the processing server 10.

Note that the timing at which the data acquisition unit 203 acquires the user data from the resource server 40 may be changed as appropriate. For example, the user data may be acquired after the agreement information is created in the processing instruction unit 201, or the user may acquire the user data from the resource server 40 in advance before the agreement information is created, and may store it in a storage device or the like (not illustrated) of the user terminal 20.

The processed data receiving unit 204 receives user data having been processed by the data processing program (IDk) in the processing server 10. Hereinafter, the user data having been processed by the data processing program (IDk) in the processing server 10 may be referred to as processed data. The program IDk, data ID, data source IDr, and server ID (IDp) are added to the processed data to be transmitted from the processing server 10.

Note that the server ID is identification information for specifying the processing server 10. For example, the server ID of the processing server 10 having processed the user data may be referred to as a server IDp.

The digital signature p by the processing server 10 is added to the processed data, program IDk, data ID, data source IDr, and server ID (IDp).

This makes it possible to suppress a situation in which the processed data or the like is forged, falsified, or the like. Note that the addition of the digital signature p to the processed data, program IDk, data ID, data source IDr, and server ID (IDp) may be enabled by using various known methods, and description thereof will be omitted.

The digital signature p may include a user ID for specifying a user who is the owner of the user data, thereby making it possible to reliably ensure that the user data is data of a proper user.

The processed data transmitting unit 205 transmits the processed data received from the processing server 10 to the service providing server 30.

The processed data transmitting unit 205 attaches the program IDk, data source IDr, and server IDp to the processed data, and transmits the processed data to the service providing server 30. Further, the processed data transmitting unit 205 adds the digital signature p by the processing server 10 to the processed data, program IDk, data source IDr, and server IDp, and transmits them to the service providing server 30.

This also makes it possible to suppress a situation in which the processed data or the like to be transmitted to the service providing server 30 is forged, falsified, or the like.

In addition, the digital signature p may include a user ID which is identification information for specifying the user, and a digital signature of the user may further be added thereto. With this, for example, the service providing server 30 may easily recognize that the data transmitted thereto is user data of the above user.

[Processing Server 10]

Figure 3:
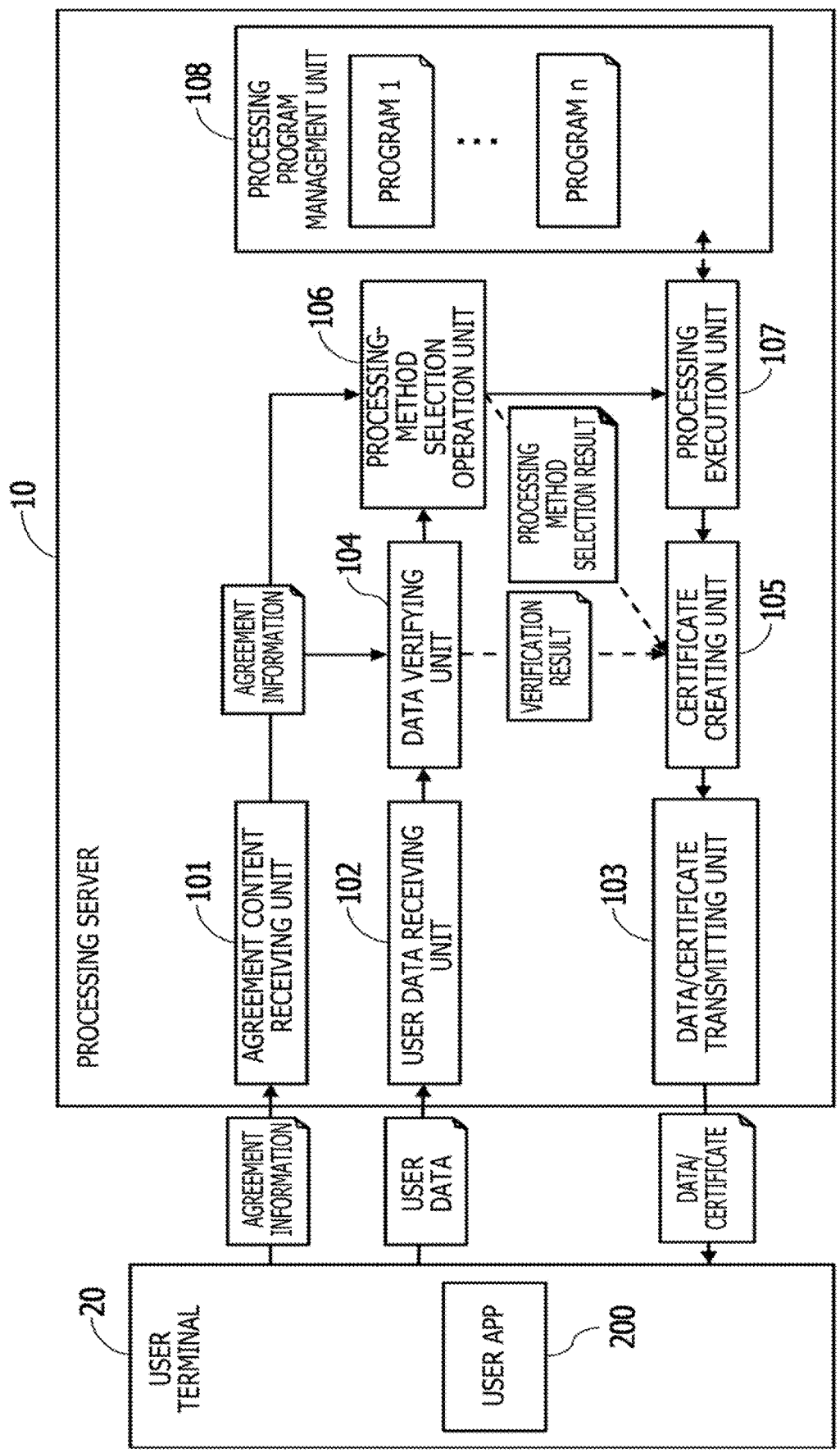
FIG. 3 is a diagram exemplifying a functional configuration of a processing server of a data processing system as an example of the first embodiment.

FIG. 3 is a diagram exemplifying a functional configuration of the processing server 10 of the data processing system 1 as an example of the first embodiment.

The processing server 10 includes an agreement content receiving unit 101, a user data receiving unit 102, a data/certificate transmitting unit 103, a data verifying unit 104, a certificate creating unit 105, a processing-method selection operation unit 106, a processing execution unit 107, and a processing program management unit 108.

The processing program management unit 108 manages data processing programs configured to process user data. For example, a plurality of types of data processing programs is stored in a storage device 13 (see FIG. 10) of the processing server 10. The storage device 13 functions as a processing program storage unit configured to store the plurality of types of data processing programs.

The processing program management unit 108 also manages program information on each data processing program. The stated program information may also be stored in the storage device 13.

For example, a developer of the data processing program uploads, after having developed the data processing program, the data processing program to the processing server 10. The processing program management unit 108 sets a unique program ID to the uploaded data processing program. At this time, the developer may upload program information for explaining the data processing program.

The processing program management unit 108 manages the data processing programs, the program IDs, and the program information in association with one another. They may be reserved in the storage device 13 provided in the processing server 10, or may be reserved in an external storage device accessible from the processing server 10.

The service provider that manages the service providing server 30 has to know what types of data processing programs are present. Accordingly, it is desirable that the developer of the data processing program informs the service provider of the program ID of the data processing program uploaded to the processing server 10 and the content of the program.

The service provider may access the processing server 10 to acquire and understand the program information and the program ID. The service provider may become a developer of the data processing program, and may create and upload the data processing program to the processing server 10, thereby understanding the content of the data processing program.

In the processing server 10, the processing program management unit 108 may receive a data processing program acquisition request from an external device, for example, with designation by a program ID. In this case, it is desirable that the processing program management unit 108 replies with sending the designated data processing program in response to the data processing program acquisition request. As a result, a third party may easily check whether the data processing program is a proper one, thereby making it possible to improve reliability.

The agreement content receiving unit 101 receives agreement information (data ID, data source ID (IDr), program IDk) transmitted from the processing instruction unit 201 of the user terminal 20. The received agreement information is stored in a memory 12, a predetermined storage area of the storage device 13, or the like of the processing server 10.

The agreement content receiving unit 101 corresponds to an agreement information receiving unit configured to receive agreement information (program ID, data source ID, data ID) regarding a processing method for user data agreed between the user and the service provider (the service providing server 30).

The user data receiving unit 102 receives user data (unprocessed data) transmitted from the processing instruction unit 201 of the user terminal 20. The user data receiving unit 102 stores the received user data in the memory 12, a predetermined storage area of the storage device 13, or the like of the processing server 10. The user data receiving unit 102 corresponds to a personal data receiving unit configured to receive personal data.

The data verifying unit 104 verifies whether the digital signature r by the resource server 40 is attached to the user data received by the user data receiving unit 102 (first verification).

When the digital signature r is attached to the received user data as a result of verification, processing to be carried out on the user data by the processing execution unit 107, which will be described later, is permitted. On the other hand, when the digital signature r is not attached to the received user data, the data verifying unit 104 may suppress the processing of the user data, and may report, to the user terminal 20 or the like, an error notification to that effect.

For the verification of the digital signature r by the data verifying unit 104, information in which the data source ID is associated with a public key corresponding to a private key used by the resource server 40 for the digital signature, may be stored in the processing server 10. Such information may be managed by using an external cloud server, blockchain, or the like, instead of using the processing server 10.

Further, the data verifying unit 104 confirms that the data source IDs and the data IDs match between the agreement information received by the agreement content receiving unit 101 and the user data received by the user data receiving unit 102 (second verification).

In the case where the data source IDs and the data IDs match between the agreement information and the user data as a result of the confirmation, the received user data is considered to be the data that the user has agreed to use and is certified as valid, and the data verifying unit 104 reports, to the certificate creating unit 105, that the user data is valid. In the case where the data source IDs and the data IDs do not match between the agreement information and the user data as a result of the confirmation, the data verifying unit 104 may discard the user data and may report, to the user terminal 20 or the like, that the user data is not valid.

The data verifying unit 104 functions as a personal data verifying unit configured to verify the validity of the received user data.

The processing-method selection operation unit 106 selects a data processing program corresponding to the program ID included in the agreement information from among the plurality of types of data processing programs managed by the processing program management unit 108, and reports the selected data processing program to the processing execution unit 107.

The processing execution unit 107 executes the data processing program selected by the processing-method selection operation unit 202 to carry out processing (arithmetic processing) on the user data certified as valid by the data verifying unit 104, thereby processing the user data. The processing execution unit 107 corresponds to a processing operation unit configured to process the user data by a processing method defined in the agreement information.

When the validity of the personal data is confirmed as a result of the verification by the data verifying unit 104, the processing execution unit 107 processes the user data.

The certificate creating unit 105 creates an electronic certificate to be added to the processed data. The electronic certificate includes the data source ID and the data ID used in the verification by the data verifying unit 104, and the program IDk of the data processing program selected by the processing-method selection operation unit 202. In addition, in order to suppress a situation in which these pieces of information (data source ID, data ID, program IDk), the processed data, and the like are falsified, the certificate creating unit 105 adds a digital signature (digital signature) created by using the private key of the processing server 10.

The data/certificate transmitting unit 103 transmits the processed data having been processed by the processing execution unit 107 to the user terminal 20. The data/certificate transmitting unit 103 adds, to the processed data, the program IDk for specifying the data processing program used for creating the processed data, the server IDp, the data ID related to the user data as a source of the processed data, and the data source IDr. Then, the data/certificate transmitting unit 103 attaches the digital signature p to the processed data, the program IDk, the data ID, the data source IDr, and the server ID (IDp), and transmits them to the user terminal 20. This suppresses a situation in which the processed data or the like is forged, falsified, or the like.

The data/certificate transmitting unit 103 corresponds to a processed data output unit configured to attach a digital signature to the processed data by the processing execution unit 107 and output the processed data.

(B) Operation

Figure 4:
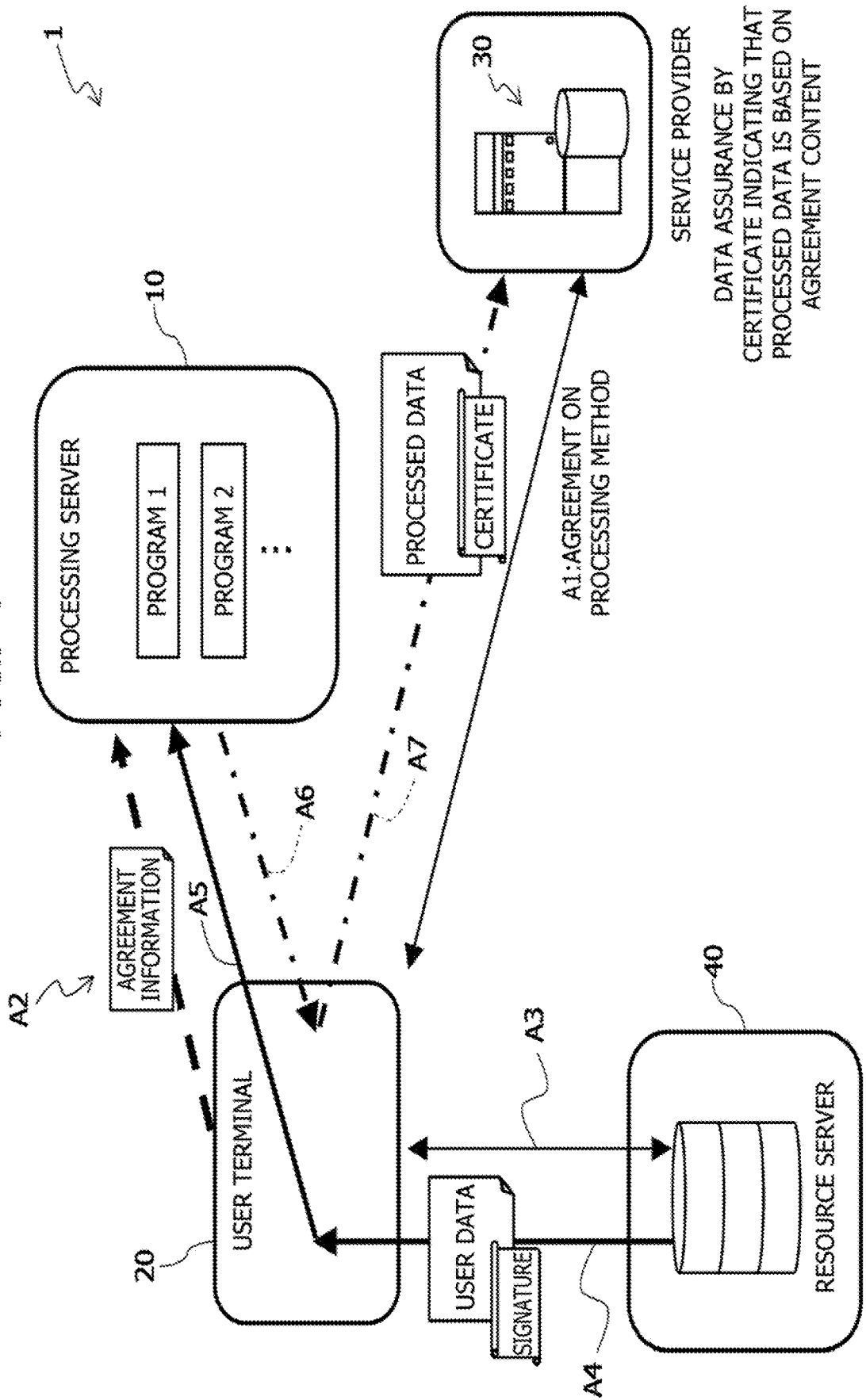
FIG. 4 is a diagram for explaining an outline of processing in a data processing system as an example of the first embodiment.

An outline of the processing in the data processing system 1 as an example of the first embodiment configured as described above will be explained with reference to FIG. 4.

A user that uses the user terminal 20 agrees with a service provider regarding user data to provide and a processing method thereof (reference symbol A1). For example, the user permits the provision of the user data to be provided to the service provider, and determines a data processing program to be used for processing the user data.

Based on this agreement, as for the user data to be provided to the service providing server 30, the processing-method selection operation unit 202 of the user terminal 20 creates agreement information including the data ID, the data source ID (IDr), and the program IDk for the processing to be carried out on the user data (see a reference symbol A2).

Further, the data acquisition unit 203 of the user terminal 20 transmits a user data acquisition request to the resource server 40 (see a reference numeral A3), and the resource server 40 adds the digital signature r to the requested user data and transmits the user data to the user terminal 20 in response to the request (see a reference symbol A4).

The processing instruction unit 201 of the user terminal 20 transmits the user data acquired from the resource server 40 to the processing server 10 together with the agreement information (see a reference symbol A5).

The processing server 10 performs data verification based on the received user data and agreement information, and then processes the user data by using the data processing program corresponding to the program ID included in the agreement information.

The data/certificate transmitting unit 103 of the processing server 10 transmits the processed data to which the electronic certificate created by the certificate creating unit 105 is added, to the user terminal 20 (see a reference symbol A6). A digital signature created by using the private key of the processing server 10 is added to these data.

The processed data transmitting unit 205 of the user terminal 20 transmits the processed data received from the processing server 10 to the service providing server 30 (see a reference symbol A7). The program IDk, data source IDr, and server IDp are attached to the processed data to be transmitted from the processed data transmitting unit 205. A digital signature p by the processing server 10 is added to these data.

The service providing server 30 verifies the digital signature p added to the processed data received from the user terminal 20, and confirms that the data received from the user terminal 20 includes the program ID agreed by the service providing server 30 itself, the data source ID, and the data ID. As a result of the confirmation, when it is confirmed that the requested user data has been received and that the processed data has been created by applying the data processing program permitted by the service provider to process the user data, the service providing server 30 is allowed to use the processed data for providing the service.

Next, details of the processing carried out by the processing server 10 in the data processing system 1 as an example of the first embodiment will be described with reference to FIG. 5.

The developer of the data processing program uploads, after having developed the data processing program, the program to the processing server 10 (see a reference symbol 81). The processing server 10 receives the uploaded data processing program, stores the program in a predetermined storage area of the storage device 13, and performs numbering of a program ID (see a reference symbol 82). The program ID having been numbered is reported to the developer. Hereinafter, in the drawings, the data processing program may be simply referred to as a program.

At this time, the developer may upload, along with the data processing program, program information regarding the data processing program. The data processing program, the program ID, and metadata (program information) are reserved in the processing server 10 in association with one another (see a reference symbol 83).

The service provider has to know what types of processing programs are present. Therefore, the processing program developer, to be of service, informs the service provider of the processing program ID and the content of the processing program. As a method, the service provider may access the processing server 10 to acquire and understand the information of the program and the program ID, or the service provider may be simply registered as a processing program developer, and therefore the service provider originally understands the content of the program.

The user app 200 of the user terminal 20 is coupled to the service providing server 30 via the network 50. The service providing server 30 notifies the user terminal 20 that a more preferable service may be provided when the user provides user data to the service provider.

The service providing server 30 requests user data from the user app 200. When requesting the user data, the service providing server 30 presents a set of a program ID group, the data source ID, and the data ID to the user app 200 (see a reference symbol B4). The program ID group indicates data processing programs that the service provider has agreed to apply to the requested user data.

The program ID makes it possible to identify which data processing program is used for processing the user data, and the data source ID and the data ID make it possible to identify which user data held by which data holder (resource server 40) is used for the processing.

The processing server 10 is so configured as to be able to provide the program information of the data processing program to the user terminal 20, the service providing server 30, and the like (see a reference symbol B5).

The processing-method selection operation unit 202 of the user terminal 20 acquires the program information corresponding to the program ID from the processing server 10 based on the program ID reported from the service providing server 30 (see a reference symbol B6). The user app 200 presents the program information to the user via a UI to check whether the user data is allowed to be provided to the service provider.

The service providing server 30 may provide a plurality of program IDs, and may ask the user which program ID is selected from among the plurality of program IDs.

The processing-method selection operation unit 202 prompts the user to select a data processing program used for processing the user data.

The processing-method selection operation unit 202 creates agreement information based on the selection result by the user. The agreement information includes a program ID of the data processing program and a set of the data source ID and data ID.

Further, in the user terminal 20, the data acquisition unit 203 requests the resource server 40 to transmit the user data to be processed (unprocessed data) based on the user data request received from the service providing server 30 (see a reference symbol B7). The data acquisition unit 203 requests the resource server 40 specified by the data source ID included in the user data request received from the service providing server 30, to transmit the user data specified by the data ID also included in the user data transmission request.

The resource server 40 reads out the user data specified by the data ID from the storage device 41 in response to the user data transmission request from the user terminal 20, and transmits the user data to the user terminal 20, which is a transmission source of the acquisition request. Further, the resource server 40 adds the data ID of the user data and the data source ID (IDr), to the user data to be transmitted. Then, the resource server 40 adds a digital signature r using the private key of the resource server 40 to the user data, the data ID, and the data source ID, and transmits them to the user terminal 20 (see a reference symbol 88).

The processing instruction unit 201 transmits the agreement information (data ID, data source IDr, program IDk) and the user data to the processing server 10, as processing instruction information (a reference symbol 89). The processing instruction unit 201 adds the signature r transmitted from the resource server 40 to the user data, the data ID, and the data source IDr in the processing instruction information.

In the processing server 10, the agreement content receiving unit 101 receives the agreement information, and the user data receiving unit 102 receives the user data (see a reference symbol B10).

The data verifying unit 104 verifies whether the digital signature r by the resource server 40 is attached to the user data received by the user data receiving unit 102.

Further, the data verifying unit 104 confirms that the data source IDs and the data IDs match between the agreement information received by the agreement content receiving unit 101 and the user data received by the user data receiving unit 102.

When the digital signature r is attached to the received user data, the user data is determined to be valid without falsification or the like. Further, in the case where the data source IDs and the data IDs match between the agreement information and the user data, the received user data is considered to be the data that the user has agreed to allow to be used by the service providing server 30, and is determined to be valid.

The processing-method selection operation unit 202 selects a data processing program corresponding to the program ID included in the agreement information from among the plurality of types of data processing programs managed by the processing program management unit 108 (see a reference symbol B11). Then, the processing execution unit 107 executes the data processing program selected by the processing-method selection operation unit 202 to carry out the processing on the user data certified as valid by the data verifying unit 104 (see a reference symbol B12).

The processing execution unit 107 receives (acquires) the processed data, which is an arithmetic operation result, from the data processing program (see a reference symbol B13), and transfers the processed data to the certificate creating unit 105.

The certificate creating unit 105 creates an electronic certificate to be added to the processed data. The electronic certificate includes the data source ID and the data ID used in the verification by the data verifying unit 104, and the program IDk of the data processing program selected by the processing-method selection operation unit 202. In addition, in order to suppress a situation in which these pieces of information (data source ID, data ID, program IDk), the processed data, and the like are falsified, the certificate creating unit 105 adds a digital signature created by using the private key of the processing server 10.

Thereafter, the data/certificate transmitting unit 103 transmits the processed data having been processed by the processing execution unit 107 to the user terminal 20 (see a reference symbol 814).

The data/certificate transmitting unit 103 adds, to the processed data, the program IDk for specifying the data processing program used for creating the processed data, the server IDp, the data ID related to the user data as a source of the processed data, and the data source IDr. Then, the data/certificate transmitting unit 103 attaches the digital signature p to the processed data, the program IDk, the data ID, the data source IDr, and the server ID (IDp), and transmits them to the user terminal 20 (see a reference symbol 815).

In the user terminal 20, the processed data receiving unit 204 receives the processed data transmitted from the processing server 10.

The processed data transmitting unit 205 attaches the program IDk, data source IDr, and server IDp to the processed data, and transmits the processed data to the service providing server 30. Further, the processed data transmitting unit 205 adds the digital signature p by the processing server 10 to the processed data, program IDk, data source IDr, and server IDp, and transmits them to the service providing server 30 (see a reference symbol B16).

The service providing server 30 verifies the digital signature p added to the processed data received from the user terminal 20, and confirms that the data received from the user terminal 20 includes the program ID agreed by the service providing server 30 itself, the data source ID, and the data ID. Thus, the service providing server 30 confirms whether the data processing program, the use of which has been previously agreed, is applied to the user data requested to the user, and then performs processing for providing the service by using the processed data.

(C) Advantages

As described above, according to the data processing system 1 as an example of the first embodiment, the set of the program ID group, the data source ID, and the data ID is Included in the user data request transmitted from the service providing server 30 to the user app 200.

On the other hand, in the user terminal 20, the processing-method selection operation unit 202 presents the data processing programs corresponding to the program IDs constituting the program ID group transmitted to the user as options to be used for processing the user data, and prompts the user to select any of the data processing programs. Thus, the processing agreed by both the service provider and the user is performed on the user data, and the user data is provided to the service provider.

For example, personal data is processed by the processing method agreed between the user and the service company, a digital signature is attached to the personal data, and the personal data is output, so that the personal data with high reliability satisfying both the requests of the user and the service company may be acquired. Accordingly, it is possible to provide the service provider with the user data (processed data) having been processed in consideration of privacy, desire, and the like of the user.

The user terminal 20 (processing instruction unit 201) transmits the user data (unprocessed data) to which the digital signature r using the private key of the resource server 40 is added, to the processing server 10, whereby the processing server 10 may acquire the user data that is valid without falsification, and the reliability may be improved.

The processing server 10 (the data/certificate transmitting unit 103) attaches the digital signature p to the processed data, the program IDk, the data ID, the data source IDr, and the server ID (IDp), and transmits them to the user terminal 20. This makes it possible to suppress a situation in which the processed data or the like is forged, falsified, or the like, and to improve the reliability.

In the user terminal 20, the processed data transmitting unit 205 attaches the program IDk, data source IDr, and server IDp to the processed data, and transmits the processed data to the service providing server 30. Further, the processed data transmitting unit 205 adds the digital signature p by the processing server 10 to the processed data, program IDk, data source IDr, and server IDp, and transmits them to the service providing server 30.

The service providing server 30 verifies the digital signature p added to the processed data received from the user terminal 20, and confirms that the data received from the user terminal 20 includes the program ID agreed by the service providing server 30 itself, the data source ID, and the data ID. As a result, it is possible for the service providing server 30 to confirm whether the received processed data is based on the user data requested to the user, thereby making it possible to improve the reliability of the processed data. Further, it is possible to confirm whether the data processing program, the use of which has been previously agreed, has been applied to the received processed data, thereby making it possible to improve the reliability of the processed data.

In the processing server 10, the user data is processed by using the data processing program uploaded by the developer in advance and managed by the processing program management unit 108, thereby making it possible to suppress information leakage or the like by an improper data processing program.

(II) Description of Second Embodiment

In the data processing system 1 of the first embodiment described above, for example, user data managed in the resource server 40 is relayed by the user terminal 20 and transferred to the processing server 10, which causes a load on the user terminal 20 to be large.

In addition, processed data created in the processing server 10 is also relayed by the user terminal 20 and transferred to the service providing server 30, which also causes the load on the user terminal 20 to be large.

In a second embodiment, a method of reducing a load exerted on operation of data transfer by using a ticket including access information for accessing data will be presented.

(A) Configuration

As in the first embodiment exemplified in FIG. 1, a data processing system 1 as an example of the second embodiment also includes a service providing server 30, resource servers 40-1 and 40-2, a processing server 10, and a user terminal 20.

Hereinafter, in the drawings, same reference symbols as the reference symbols described earlier denote the same constituent elements, and therefore detailed descriptions thereof will be omitted.

[Service Providing Server 30]

In the second embodiment, as in the first embodiment, the service providing server 30 requests user data from the user terminal 20, processes the user data sent as a reply in response to the request, and provides a service.

The service providing server 30 of the second embodiment receives, from the user terminal 20, a ticket p for accessing processed data, and acquires the processed data from the processing server 10 by using information described in the ticket p.

The ticket p corresponds to a first ticket including first access information for accessing the processed data stored in the storage device 13.

The ticket has access information for accessing data, and this access information enables access to the data. Note that the ticket may be information indicating an access right to the data. In the ticket p to be received by the service providing server 30, there is described the information for accessing the processed data stored in a network storage device 60, which is managed by the processing server 10. The processing server 10 sends appropriate data (processed data), as a reply, from the storage device 13 based on the information described in the ticket p.

The information for accessing the processed data of the processing server 10 described in the ticket p is, for example, link information or an access command. The link information may be, for example, a Uniform Resource Locator (URL). The information for accessing the data described in the ticket is not limited to the link information, the access command, and the like, and various modifications may be made and put into effect. In a case where link information, an access command, or the like is not described therein, the stated information may be acquired by another method. The ticket p may be information indicating an access right to the processed data.

When the ticket p is provided to the service providing server 30, it is desirable that the service providing server 30 accesses the processing server 10, performs user authentication or the like, and then receives the processed data.

For example, the service providing server 30 may check an ID and a signature in metadata of the ticket p, access the processing server 10 based on the metadata, and acquire the processed data. In order to suppress falsification, for example, a digital signature using the private key of the processing server 10 is added to the ticket The service providing server 30 verifies a digital signature p added to the ticket p, and confirms that the digital signature p includes agreement information (a program ID, a data source ID, and a data ID) having been agreed by the service providing server 30 itself. The agreement information may include a program IDk, and the service providing server 30 may verify the program ID.

Note that the program ID, the data source ID, the data ID, and the program IDk may be included in the processed data instead of the ticket p, and in this case, the verification of the digital signature p added to the ticket p may be omitted.

The service providing server 30 accesses the processing server 10, transmits the ticket p, and receives the corresponding user data.

When the program ID, the data source ID, and the data ID are provided on the processed data side as described above, the service providing server 30 confirms that the program ID, the data source ID, and the data ID match the agreement content Thus, the service providing server 30 is able to confirm the reception of the processed data having been agreed by itself (service provider).

The service providing server 30 provides a service by using the processed data received from the processing server 10.

[Resource Server 40]

In the data processing system 1 of the second embodiment, the resource server 40 issues a ticket r for accessing user data and provides the ticket r to the user terminal 20, instead of transferring the user data to the user terminal 20. In the ticket r, information (for example, link information or an access command) for referencing some of the user data held by the resource server 40 is described, and when the resource server 40 receives the ticket r, the resource server 40 sends appropriate user data as a reply based on the above information. The link information may be, for example, a URL The ticket r may be information indicating an access right to the user data.

The ticket r corresponds to a second ticket including second access information for accessing the user data stored in the resource server 40.

The resource server 40 corresponds to a second ticket issuing unit configured to issue a second ticket (r) including second access information for accessing the user data stored in the resource server 40.

The ticket r provided to the user is associated with the user data of the user, and when the resource server 40 receives the ticket r, the resource server 40 sends the user data associated with the ticket as a reply.

The transmission destination of the ticket r may not be the user. When the ticket r is obtained, it is possible to obtain the user data associated with the ticket r. Information (for example, a URL) for accessing the resource server 40 may be described in the ticket r. Note that, instead of describing the information for accessing the resource server 40 in the ticket r, the information may be changed and put into effect as appropriate. For example, command information indicating a command for causing the user terminal 20 to execute an operation of acquiring the user data of the resource server 40 may be described in the ticket r.

When the resource server 40 provides the ticket r to the user app 200, the user app 200 accesses the resource server 40, performs user authentication or the like, and then receives the user data. Further, in the ticket r, there are described a data ID and a data source ID indicating a storage location of the user data that is requested to be acquired. Instead of describing the data source ID and the data ID, the data source ID and the data ID with which the ticket r is associated may be recognized by being combined with other information. A digital signature is added to the ticket r to suppress falsification.

The ticket r is provided with metadata, and the resource server 40 adds a data source IDr, which is identification information for specifying the resource server 40 itself, to the metadata. The resource server 40 adds a digital signature r using the private key of the resource server 40 to the ticket r, and transmits the ticket r to the user terminal 20.

This makes it possible to suppress a situation in which the ticket r is forged, falsified, or the like. The addition of the digital signature r to the ticket r may be enabled by using various known methods, and description thereof will be omitted.

The digital signature r may include a user ID for specifying a user who is the owner of the user data, thereby making it possible to reliably ensure that the user data is data of a proper user.

When the ticket r is transmitted, the resource server 40 sends user data corresponding to the ticket r, as a reply, to the processing server 10.

[User Terminal 20]

In the data processing system 1 as an example of the second embodiment, the user app 200 of the user terminal 20 transmits the ticket r to the processing server 10, instead of transmitting the user data thereto.

As in the first embodiment, the user app 200 of the user terminal 20 of the second embodiment accesses the service providing server 30 and makes an agreement. At the time of making the agreement, the user app 200 has to confirm the holding of a ticket corresponding to the data source ID and the data ID included in the agreement information. Then, the user app 200 transmits the ticket corresponding to the agreement content and the agreement content, to the processing server 10.

Figure 6:
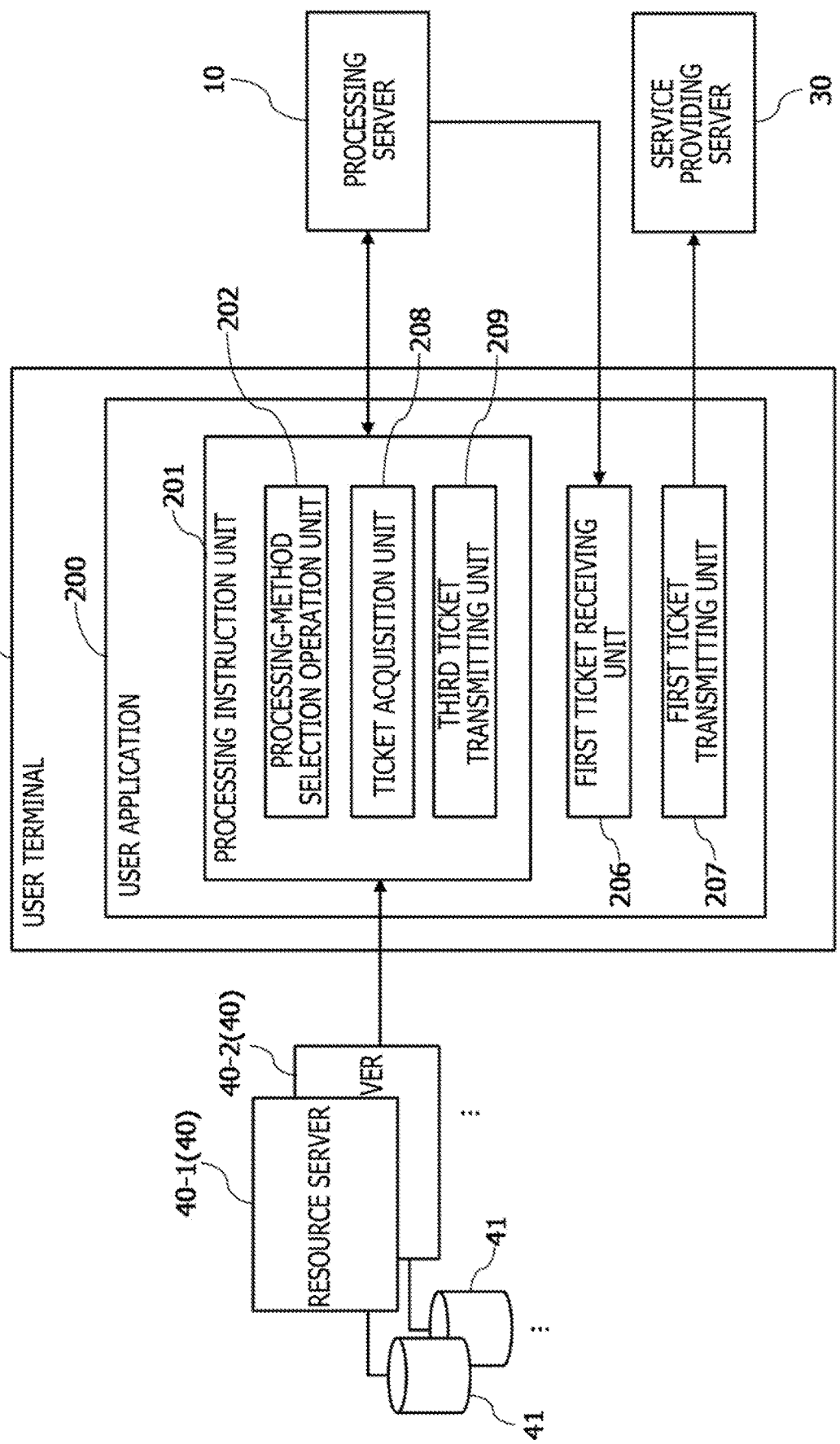
FIG. 6 is a diagram exemplifying a functional configuration of a user terminal of a data processing system as an example of a second embodiment.

FIG. 6 is a diagram exemplifying a functional configuration of the user terminal 20 of the data processing system 1 as an example of the second embodiment.

The user terminal 20 of the second embodiment has functions as a processing instruction unit 201, a first ticket receiving unit 206, and a first ticket transmitting unit 207. The functions as the processing instruction unit 201, the first ticket receiving unit 206, and the first ticket transmitting unit 207 are enabled by a processor 21 (see FIG. 11) included in the user terminal 20 executing the user application 200.

The processing instruction unit 201 of the second embodiment has functions as a processing-method selection operation unit 202, a ticket acquisition unit 208, and a third ticket transmitting unit 209.

The ticket acquisition unit 208 receives the ticket r for acquiring the user data from the resource server 40.

The third ticket transmitting unit 209 transmits the ticket r received by the ticket acquisition unit 208 to the processing server 10 together with the agreement information.

The processing instruction unit 201 notifies the processing server 10 of the ticket r and the program IDk as processing instruction information.

Of the processing instruction Information, the program IDk corresponds to the agreement information indicating the agreement content with respect to the processing of the user data by the data processing program.

The first ticket receiving unit 206 receives the ticket p transmitted from the processing server 10. The digital signature p by the processing server 10 is added to the ticket p.

This makes it possible to suppress a situation in which the ticket p is forged, falsified, or the like. The addition of the digital signature p to the ticket p may be enabled by using various known methods, and description thereof will be omitted.

The digital signature p may include a user ID for specifying a user who is the owner of the user data, thereby making it possible to reliably ensure that the user data is data of a proper user.

The first ticket transmitting unit 207 transmits the ticket p received from the processing server 10 to the service providing server 30.

[Processing Server 10]

Figure 7:
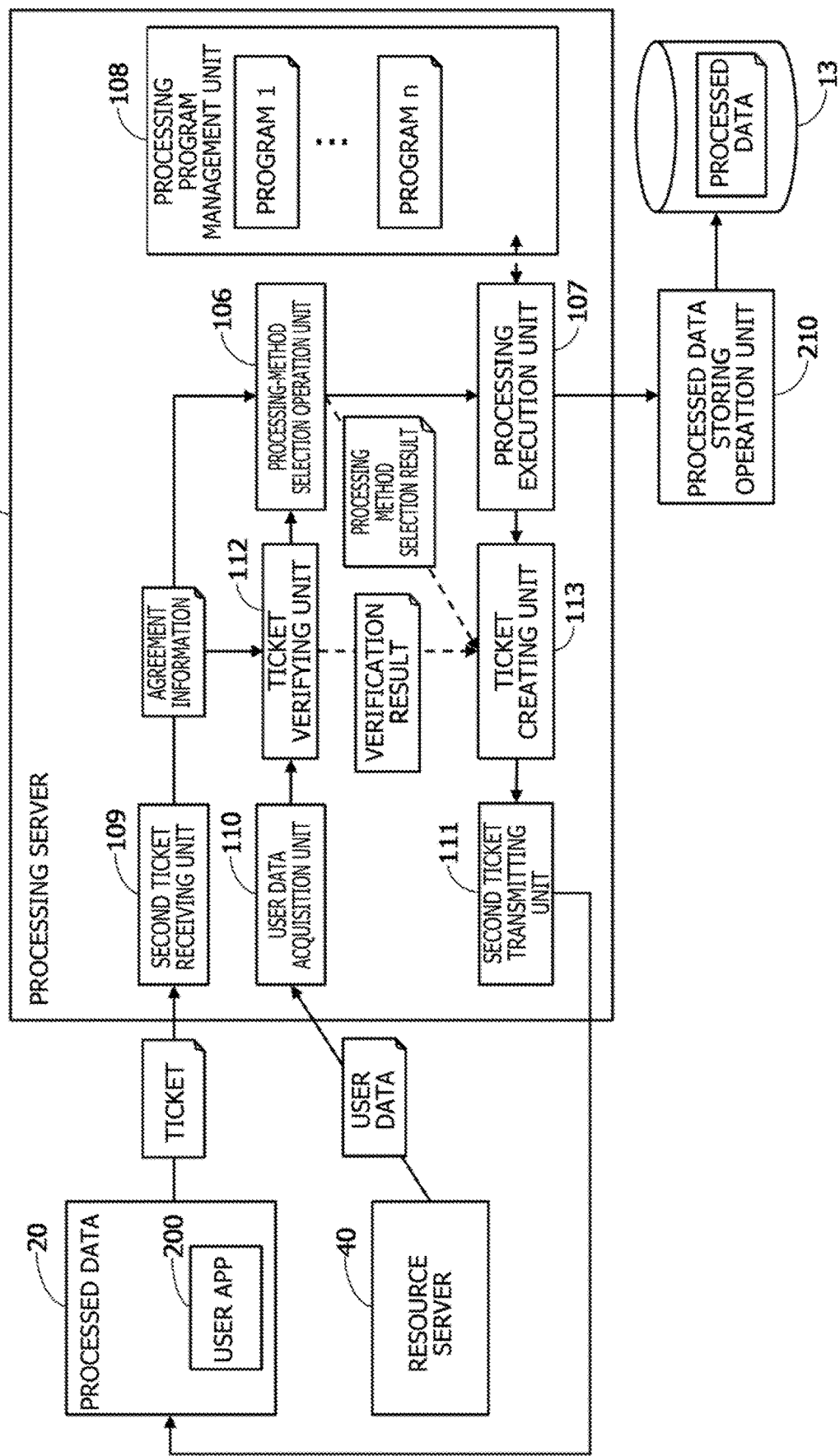
FIG. 7 is a diagram exemplifying a functional configuration of a processing server of a data processing system as an example of the second embodiment.

FIG. 7 is a diagram exemplifying a functional configuration of the processing server 10 of the data processing system 1 as an example of the second embodiment.

The processing server 10 includes a second ticket receiving unit 109, a user data acquisition unit 110, a second ticket transmitting unit 111, a ticket verifying unit 112, a ticket creating unit 113, a processing-method selection operation unit 106, a processing execution unit 107, and a processing program management unit 108.

The second ticket receiving unit 109 receives the ticket r and the agreement information (data ID, data source IDr, program IDk) transmitted from the third ticket transmitting unit 209 of the user terminal 20.

The ticket verifying unit 112 verifies the ticket r received by the second ticket receiving unit 109. The ticket verifying unit 112 confirms that the data source ID and the data ID described in the received ticket r match the data source ID and the data ID included in the agreement information. In addition, the ticket verifying unit 112 verifies whether the digital signature r by the resource server 40 is attached to the ticket r.

In the case where at least one of the confirmation of the data source ID and data ID and the verification of the digital signature r has been unsuccessful, the ticket verifying unit 112, for example, sends an error message as a reply to the user terminal 20 and suppresses the processing of the user data.

The user data acquisition unit 110 acquires the user data from the resource server 40. In the case where the ticket verifying unit 112 has succeeded in both the confirmation of the data source ID and data ID and the verification of the digital signature r, the user data acquisition unit 110 accesses the resource server 40 by using the ticket r, transmits the ticket r to the resource server 40, and receives the corresponding user data. Note that the user data may include the data source ID and the data ID. In this case, the ticket verifying unit 112 checks whether the data source ID and the data ID included in the user data match the data source ID and the data ID included in the agreement content.

The user data acquisition unit 110 acquires the user data by transmitting the ticket r to the resource server 40 based on the metadata of the ticket r received by the second ticket receiving unit 109. The user data acquisition unit 110 stores the acquired user data in the memory 12 of the processing server 10 or in a predetermined storage area of the storage device 13 thereof.

The user data acquisition unit 110 corresponds to a personal data receiving unit configured to receive personal data.

A processed data storing operation unit 210 stores the processed data created by the processing execution unit 107 in the storage device 13. The processed data storing operation unit 210 corresponds to a processing operation unit configured to process the user data by the processing method defined in the agreement information.

The ticket creating unit 113 creates a ticket p for providing the processed data created by the processing execution unit 107 to the service providing server 30.

The ticket may include a program ID of the data processing program having been used for the processing, or may include a data source ID, data ID, and the like of unprocessed data. The program ID, the data source ID, and the data ID may be included on a side of the processed data to be transferred in exchange for the ticket p, instead of being included in the ticket p.

In addition, information (for example, link information or an access command) for accessing the processing server 10 in order to acquire the user data may be described in the ticket p. The link information may be, for example, a URL. The information (for example, the URL) for accessing the processing server 10 may be provided to the service providing server 30 by a method other than attaching the information to the ticket p or the processed data. The ticket creating unit 113 adds a digital signature p for suppressing falsification of the ticket p. The ticket p to which the digital signature p is added may be referred to as a signature-attached ticket p.

The ticket creating unit 113 corresponds to a first ticket issuing unit configured to issue a first ticket (p).

The second ticket transmitting unit 111 transmits the signature-attached ticket p to the user terminal 20.

(B) Operation

Figure 8:
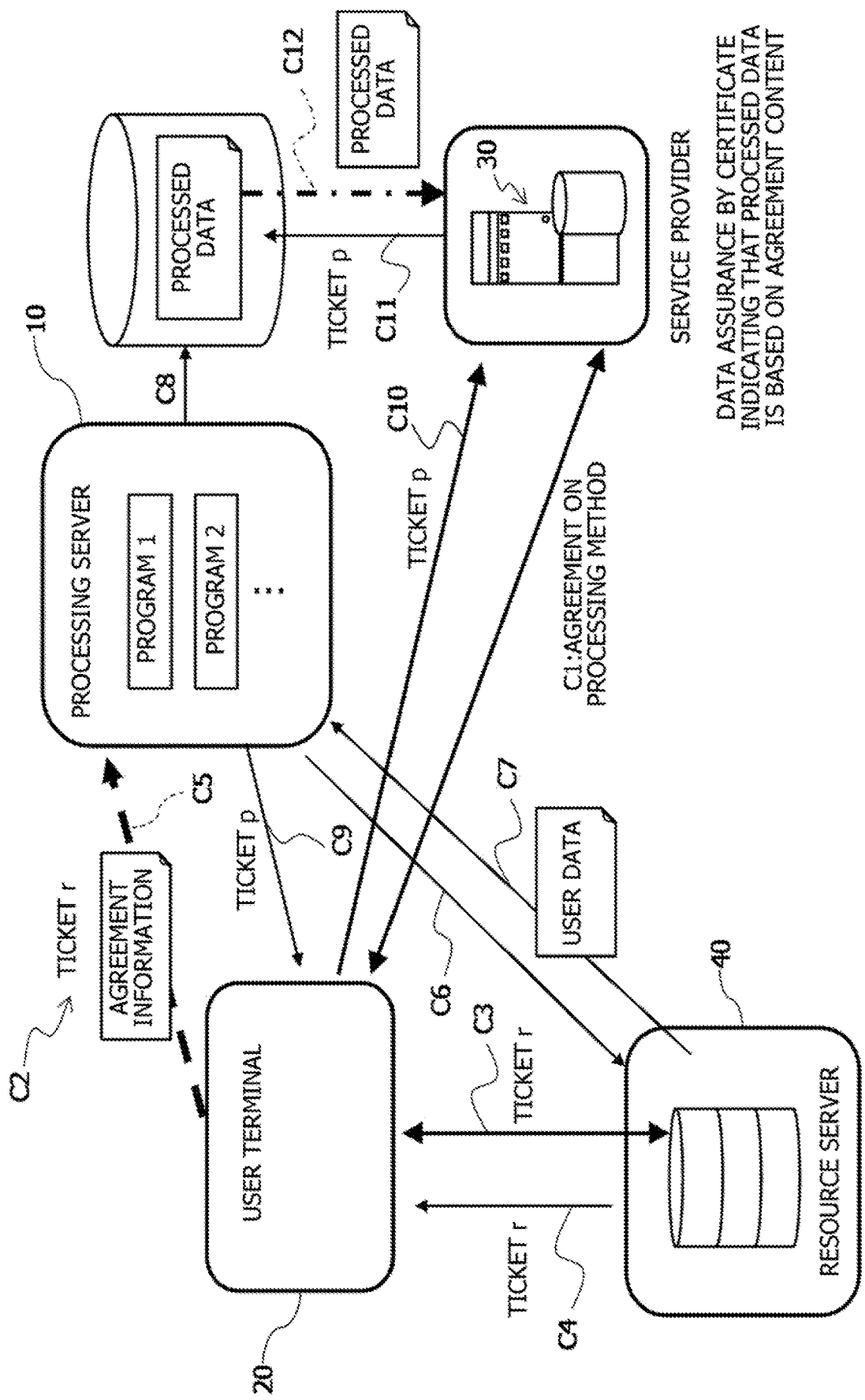
FIG. 8 is a diagram for explaining an outline of processing in a data processing system as an example of the second embodiment.

An outline of the processing in the data processing system 1 as an example of the second embodiment configured as described above will be explained with reference to FIG. 8. Hereinafter, in the drawings, same reference symbols as the reference symbols described earlier denote the same constituent elements, and therefore detailed descriptions thereof will be omitted.

A user that uses the user terminal 20 agrees with a service provider regarding user data and a processing method thereof (reference symbol C1). For example, the user permits the provision of the user data to be provided to the service provider, and determines a data processing program to be used for processing the user data.

Based on this agreement, as for the user data to be provided to the service providing server 30, the processing-method selection operation unit 202 of the user terminal 20 creates agreement information including the data ID, the data source ID (IDr), and the program IDk for the processing to be carried out on the user data (see a reference symbol C2).

In addition, the ticket acquisition unit 208 of the user terminal 20 transmits a ticket issuance request for acquiring the user data to the resource server 40 (see a reference symbol C3), and the resource server 40 creates a ticket r in response to the request, adds a digital signature r to the ticket r, and transmits the ticket r to the user terminal 20 (see a reference symbol C4).

The processing instruction unit 201 of the user terminal 20 transmits the ticket r acquired from the resource server 40 to the processing server 10 together with the agreement information (see a reference symbol C5).

In the processing server 10, after performing the verification based on the received ticket r and agreement information, the user data acquisition unit 110 accesses the resource server 40 by using the ticket r, and transmits the ticket r to the resource server 40 (see a reference symbol C6). In response to the ticket r, the resource server 40 transmits the corresponding user data to the processing server 10 (see a reference symbol C7).

In the processing server 10, the processing execution unit 107 processes the user data by using the data processing program corresponding to the program ID included in the agreement information. The processed data storing operation unit 210 stores the created processed data in the storage device 13 (see a reference symbol C8).

In the processing server 10, the ticket creating unit 113 creates a ticket p for providing the processed data to the service providing server 30, and the second ticket transmitting unit 111 transmits the ticket p to the user terminal 20 (see a reference symbol C9).

In the user terminal 20, the first ticket transmitting unit 207 transmits the ticket p to the service providing server 30 (see a reference symbol C10).

After verifying the digital signature p added to the ticket, the service providing server 30 accesses the processing server 10 and transmits the ticket p (see a reference symbol C11). In response to the ticket p, the processing server 10 transmits the corresponding processed data to the service providing server 30 (see a reference symbol C12). The service providing server 30 uses the processed data for providing the service.

Next, details of the processing carried out by the processing server 10 in the data processing system 1 as an example of the second embodiment will be described with reference to FIG. 9.

Figure 5:
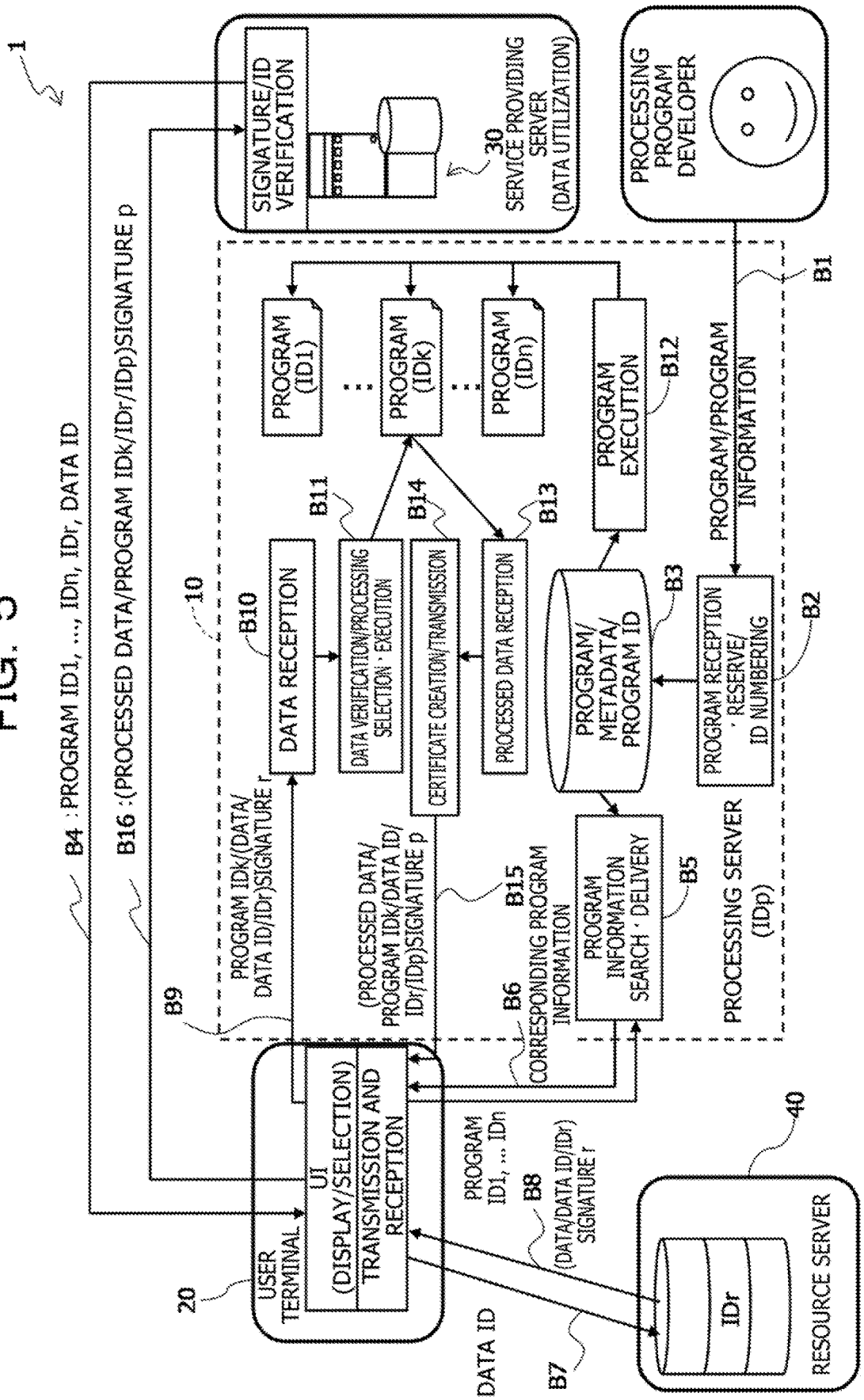
FIG. 5 is a diagram for explaining details of processing by a processing server in a data processing system as an example of the first embodiment.
Figure 9:
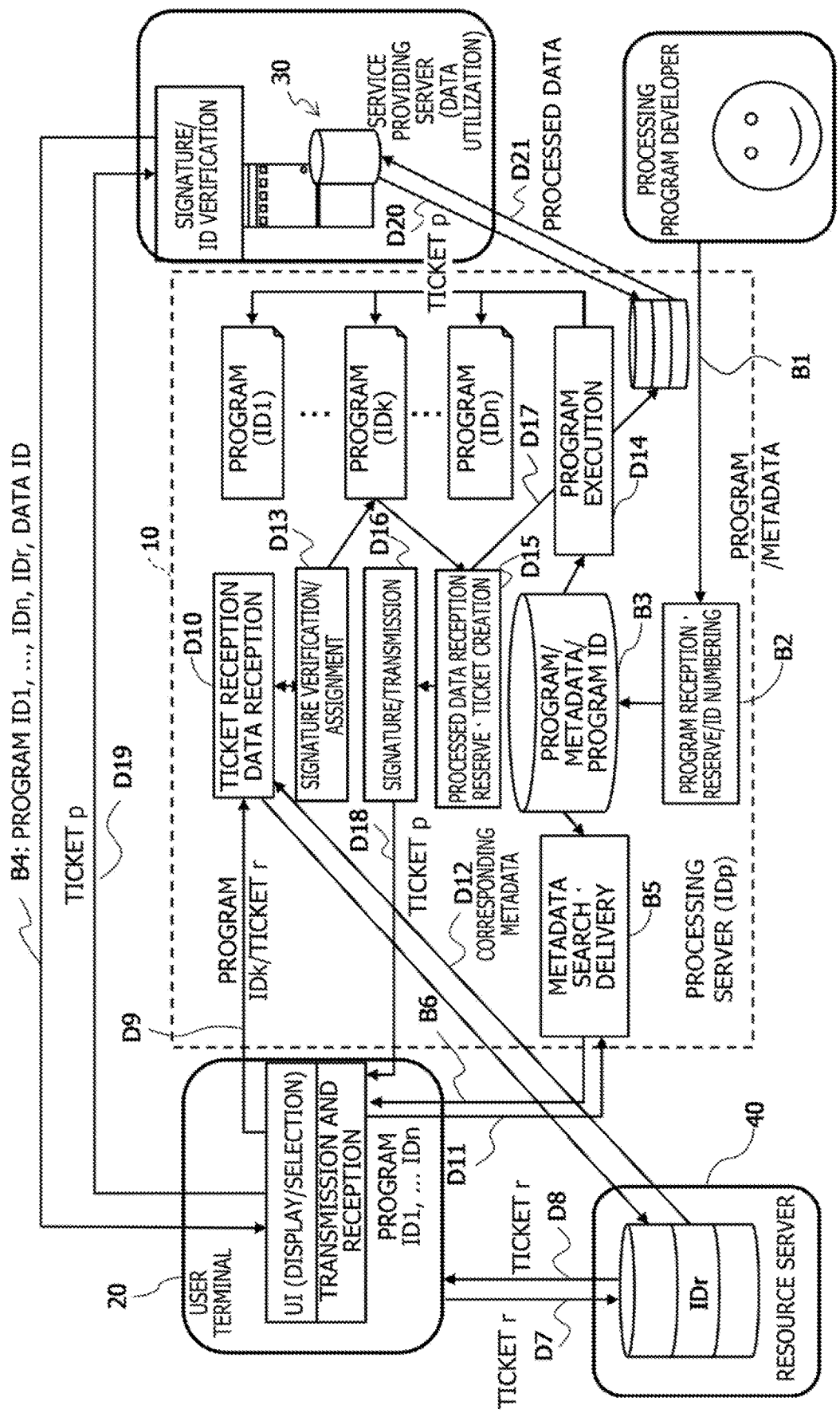
FIG. 9 is a diagram for explaining details of processing by a processing server in a data processing system as an example of the second embodiment.

In FIG. 9, same reference symbols as the reference symbols described in FIG. 5 denote the same constituent elements, and therefore detailed descriptions thereof will be omitted.

In the user terminal 20, the ticket acquisition unit 208 requests the resource server 40 to issue a ticket for accessing the user data based on the user data request received from the service providing server 30 (see a reference symbol D7).

The resource server 40 issues the ticket r in response to the ticket issuance request from the user terminal 20. The resource server 40 adds a digital signature r using the private key of the resource server 40 to the ticket r, and transmits the ticket r to the user terminal 20 (see a reference symbol D8).

In the user terminal 20, the ticket acquisition unit 208 receives the ticket r for acquiring the user data from the resource server 40, and the third ticket transmitting unit 209 transmits the ticket r received by the ticket acquisition unit 208 to the processing server 10 together with the agreement information (see a reference symbol D9).

In the processing server 10, the second ticket receiving unit 109 receives the ticket r and the agreement information (data ID, data source IDr, program IDk) transmitted from the third ticket transmitting unit 209 of the user terminal 20 (see a reference symbol D10).

The ticket verifying unit 112 confirms that the data source ID and the data ID added to the ticket r received by the second ticket receiving unit 109 match the data source ID and the data ID included in the agreement information. In addition, the ticket verifying unit 112 verifies whether the digital signature r by the resource server 40 is attached to the ticket r (see a reference symbol D13).

When both the confirmation of the data source ID and data ID and the verification of the digital signature r are successful, it is determined that the received ticket r is valid.

The user data acquisition unit 110 accesses the resource server 40 by using the ticket r, and transmits the ticket r to the resource server 40 (see a reference symbol D11).

The resource server 40 sends the user data corresponding to the received ticket r, as a reply, to the processing server 10 (see a reference symbol D12), and the user data acquisition unit 110 receives the user data.

The processing-method selection operation unit 202 selects a data processing program corresponding to the program ID included in the agreement information from among the plurality of types of data processing programs managed by the processing program management unit 108.

Then, the processing execution unit 107 executes the data processing program selected by the processing-method selection operation unit 202 to carry out the processing on the user data certified as valid by the data verifying unit 104 (see a reference symbol D14). With this, processed data is created.

The processed data storing operation unit 210 receives the created processed data (see a reference symbol D15), and stores the processed data in a predetermined storage area of the storage device 13 (see a reference symbol D17).

The ticket creating unit 113 creates a ticket p for providing the processed data created by the processing execution unit 107 to the service providing server 30. Further, the ticket creating unit 113 adds a digital signature p for suppressing falsification of the ticket p. The second ticket transmitting unit 111 transmits the signature-attached ticket p to the user terminal 20 (see reference symbols D16 and D18).

In the user terminal 20, the first ticket receiving unit 206 receives the ticket p transmitted from the processing server 10. Then, the first ticket transmitting unit 207 transmits the ticket p to the service providing server 30 (see a reference symbol D19).

The service providing server 30 accesses the processing server 10 by using the ticket p received from the user terminal 20 (see a reference symbol D20), transmits the ticket p to the processing server 10, and receives the corresponding processed data (see a reference symbol D21).

The service providing server 30 performs processing for providing a service by using the received processed data.

(C) Advantages

As described above, the data processing system 1 as an example of the second embodiment is able to exhibit similar functions and advantages to those of the first embodiment.

The resource server 40 transmits the ticket r to the user terminal 20 instead of transmitting the user data, and the user terminal 20 transmits the ticket r to the processing server 10. As a result, the user terminal 20 does not transmit and receive the user data to and from the resource server 40, the processing server 10, and the like, so that the load on the user terminal 20 may be reduced compared to the first embodiment.

Further, in the processing server 10, instead of transmitting the processed data created by the processing execution unit 107 to the user terminal 20, the processed data storing operation unit 210 stores the processed data in the storage device 13 provided in the processing server 10. Then, the second ticket transmitting unit 111 transmits the ticket p created by the ticket creating unit 113 to the user terminal 20, and the user terminal 20 transmits the ticket p to the service providing server 30. As a result, the user terminal 20 does not transmit and receive the processed data to and from the processing server 10, the service providing server 30, and the like, so that the load on the user terminal 20 may be reduced compared to the first embodiment.

The resource server 40 adds a digital signature r using the private key of the resource server 40 to the ticket r, and transmits the ticket r to the user terminal 20. This makes it possible to suppress a situation in which the ticket r is forged, falsified, or the like, and to improve the reliability.

Further, in the processing server 10 as well, the ticket creating unit 113 adds a digital signature p for suppressing falsification of the ticket p. This makes it possible to suppress a situation in which the ticket p is forged, falsified, or the like, and also makes it possible to improve the reliability.

(D) Others

[Hardware Configuration of Processing Server 10]

Figure 10:
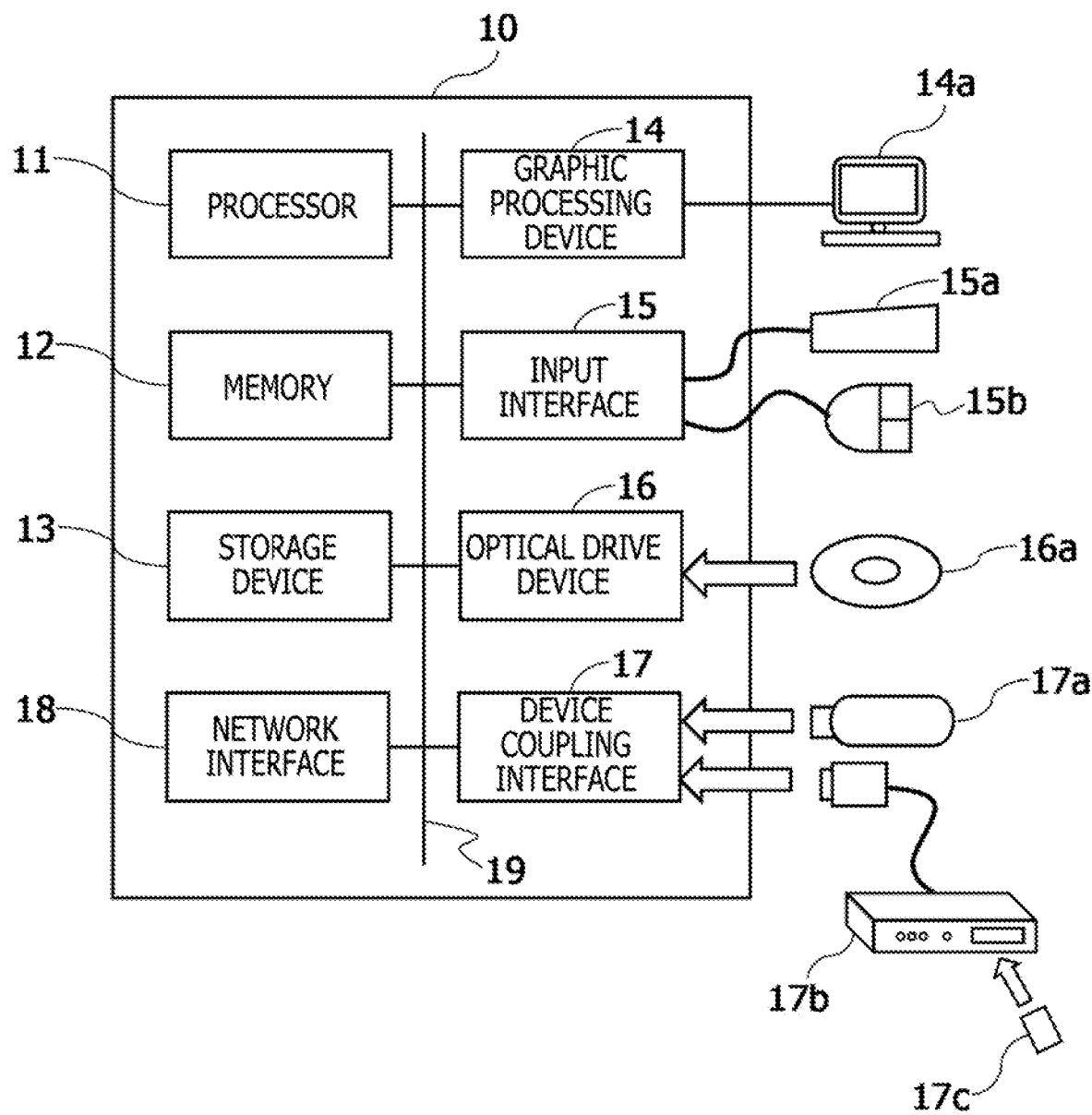
FIG. 10 is a diagram exemplifying a hardware configuration of a processing server of a data processing system as an example of the first embodiment and the second embodiment.

FIG. 10 is a diagram exemplifying a hardware configuration of the processing server 10 of the data processing system 1 as an example of the first embodiment and the second embodiment.

The processing server 10 includes, for example, the processor 11, a random-access memory (RAM) 12, a hard disk drive (HDD) 13, a graphic processing device 14, an input interface 15, an optical drive device 16, a device coupling interface 17, and a network interface 18, as constituent elements. These constituent elements 11 to 18 are so configured as to be mutually communicable via a bus 19.

The processor (operation unit) 11 controls the overall processing server 10. The processor 11 may be a multiprocessor. The processor 11 may be any one of a CPU, a microprocessor unit (MPU), a digital signal processor (DSP), an application-specific integrated circuit (ASIC), a programmable logic device (PLD), and a field-programmable gate array (FPGA), for example. The processor 11 may be a combination of two or more constituent elements from among the CPU, the MPU, the DSP, the ASIC, the PLD, and the FPGA.

The RAM (storage unit) 12 is used as a main storage device of the processing server 10. At least some of operating system (OS) programs and application programs, which are executed by the processor 11, are temporarily stored in the RAM 12. In the RAM 12, various types of data to be used in the processing by the processor 11 are stored. The application programs may include a data processing program executed by the processor 11 in order to enable the data processing function of the present embodiment by the processing server 10.

The HDD 13 magnetically writes and reads data to and from a built-in disk. The HDD 13 is used as an auxiliary storage device of the processing server 10. The HDD 13 stores the OS programs, the application programs, and the various types of data. As the auxiliary storage device, a semiconductor storage device such as a storage class memory (SCM), a flash memory, or the like may also be used.

A monitor 14a is coupled to the graphic processing device 14. The graphic processing device 14 displays an image in a screen of the monitor 14a in accordance with a command from the processor 11. A display device using a cathode ray tube (CRT), a liquid crystal display device, and the like are exemplified as the monitor 14a.

A keyboard 15a and a mouse 15b are coupled to the input interface 15. The input interface 15 transmits signals sent from the keyboard 15a and the mouse 15b to the processor 11. The mouse 15b is an example of a pointing device, and other pointing devices may also be used. Examples of the other pointing devices include a touch panel, a tablet, a touch pad, a track ball, and the like.

The optical drive device 16 reads data recorded in an optical disk 16a by using laser light or the like. The optical disk 16a is a portable non-transitory recording medium in which data is recorded to be readable using light reflection. Examples of the optical disk 16a include a digital versatile disc (DVD), a DVD-RAM, a compact disc read-only memory (CD-ROM), a CD-Recordable (R)/ReWritable (RW), and the like.

The device coupling interface 17 is a communication interface for coupling peripheral devices to the processing server 10. To the device coupling Interface 17, for example, a memory device 17a and a memory reader/writer 17b may be coupled. The memory device 17a is a non-transitory recording medium, such as a Universal Serial Bus (USB) memory, equipped with a communication function with the device coupling interface 17. The memory reader/writer 17b writes data to a memory card 17c or reads data from the memory card 17c. The memory card 17c is a card-type non-transitory recording medium.

The network interface 18 is coupled to the network 50. The network interface 18 transmits and receives data to and from other computers or communication devices via the network 50.

In the processing server 10 having the above-described hardware configuration, the processor 11 executes the data processing program for the processing server to enable the above-described functions as the agreement content receiving unit 101, the user data receiving unit 102, the data/certificate transmitting unit 103, the data verifying unit 104, the certificate creating unit 105, the processing-method selection operation unit 106, the processing execution unit 107, and the processing program management unit 108 (in the case of the first embodiment). Further, in the processing server 10, the processor 11 executes the data processing program for the processing server to enable the above-described functions as the second ticket receiving unit 109, the user data acquisition unit 110, the second ticket transmitting unit 111, the ticket verifying unit 112, the ticket creating unit 113, the processing-method selection operation unit 106, the processing execution unit 107, and the processing program management unit 108 (in the case of the second embodiment).

The RAM 12 stores the above-described agreement information, user data, tickets, and the like. The agreement information, the user data, and the tickets may be stored in the HDD 13. Further, the storage device 13 stores the plurality of types of data processing programs described above.

[Hardware Configuration of User Terminal 20]

Figure 11:
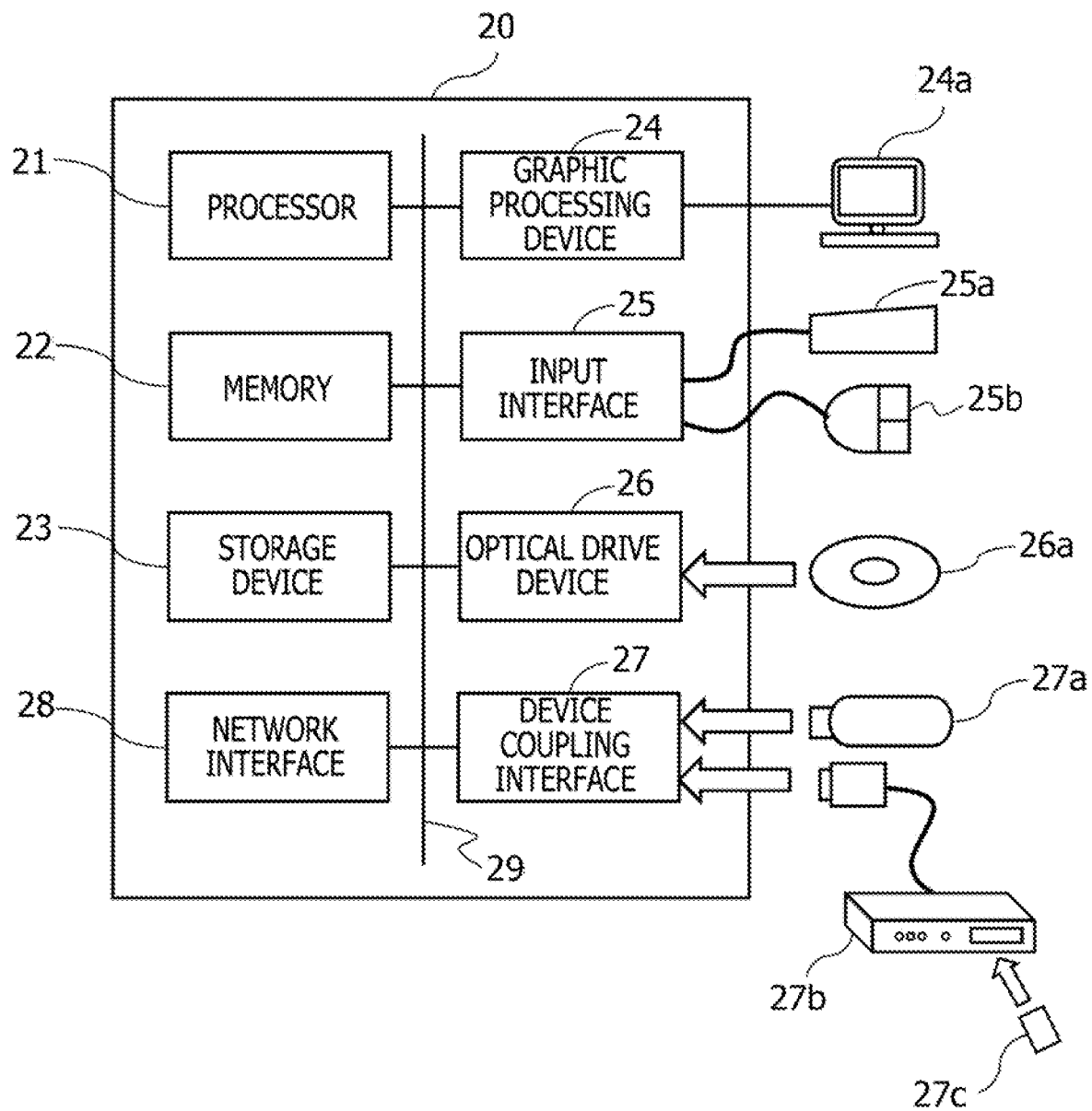
FIG. 11 is a diagram exemplifying a hardware configuration of a user terminal of a data processing system as an example of the first embodiment and the second embodiment.

FIG. 11 is a diagram exemplifying a hardware configuration of the user terminal 20 of the data processing system 1 as an example of the first embodiment and the second embodiment.

The user terminal 20 includes, for example, the processor 21, a RAM 22, an HDD 23, a graphic processing device 24, an input interface 25, an optical drive device 26, a device coupling interface 27, and a network interface 28, as constituent elements. These constituent elements 21 to 28 are so configured as to be mutually communicable via a bus 29.

The processor 21, the RAM 22, the HDD 23, the graphic processing device 24, the input interface 25, the optical drive device 26, the device coupling interface 27, and the network interface 28 in the user terminal 20 have similar functional configurations to those of the processor 11, the RAM 12, the HDD 13, the graphic processing device 14, the input interface 15, the optical drive device 16, the device coupling interface 17, and the network interface 18 in the processing server 10, and therefore detailed descriptions thereof are omitted.

Note that the RAM 22 is used as a main storage device in the user terminal 20. At least some of OS programs and application programs, which are executed by the processor 21, are temporarily stored in the RAM 22. In the RAM 22, various types of data to be used in the processing by the processor 21 are stored. The application programs may include a data processing program for the user terminal executed by the processor 21 in order to enable the data processing function of the present embodiment by the user terminal 20.

In the user terminal 20 having the above-described hardware configuration, the processor 21 executes the data processing program for the user terminal to enable the above-described functions as the processing instruction unit 201, the processed data receiving unit 204, and the processed data transmitting unit 205 (in the case of the first embodiment). Further, the processor 21 executes the data processing program for the user terminal to enable the above-described functions as the processing instruction unit 201, the first ticket receiving unit 206, and the first ticket transmitting unit 207 (in the case of the second embodiment).

The RAM 22 stores the above-described agreement information, user data, tickets, and the like. The agreement information, the user data, the tickets, and the like may be stored in the HDD 23.

Techniques disclosed herein are not limited to the aforementioned embodiments, and may be implemented by making various modifications thereon without departing from the gist of the embodiments. The configurations and the processes of the embodiments may be selectively used as desired, or may be appropriately combined.

Techniques disclosed herein are not limited to the aforementioned embodiments, and may be implemented by making various modifications thereon without departing from the gist of the embodiments. The configurations and the processes of the embodiments may be selectively used as desired, or may be appropriately combined.

For example, in the example illustrated in FIG. 1, a single user terminal 20, a single processing server 10, and a single service providing server 30 are provided, and two resource servers 40-1 and 40-2 are provide; however, the embodiment is not limited thereto. The numbers of user terminals 20, processing servers 10, resource servers 40, and service providing servers 30 may be respectively changed and put into effect as appropriate.

In addition, for example, when the processed data, the ticket p, and the like to which the digital signature p is attached are transmitted from the user terminal 20 to the service providing server 30, it is desirable that a public key used for the verification of the digital signature p performed in the service providing server 30 is able to be acquired based on the ID.

The program information of the data processing program in the processing server 10 may be optionally edited. As a result, it is possible to add explanation of the data processing program to the program information in order to make a user easily understand the data processing program, thereby making It possible to easily obtain the agreement of the user and to improve work efficiency.

There may be provided a function of checking the operation of each of the data processing programs stored in the processing server 10 so as to check whether unwanted communication or the like is performed. With this, for example, even when an improper code is embedded in the data processing program by a developer or the like, the improper code may be easily found, and information leakage or the like due to impropriety of the data processing program may be suppressed. For example, this may improve the reliability.

Further, for example, the user application 200 of the user terminal 20 may transmit the information of the user data received from the service providing server 30 to the processing server 10. The processing server 10 may delete part of the user data based on the information of the user data, and then transfer the user data to the data processing program. With this, when there is an unwanted portion for data processing in the user data, the unwanted portion is not transferred to the data processing program, thereby making it possible to suppress information leakage due to impropriety of the data processing program.

Furthermore, when the data processing program is executed in the processing server 10, for example, information on the execution time, the program ID of the activated data processing program, or the like may be reserved as an execution log, and the execution log may be acquired by a third party. As a result, it is possible for the service provider (service providing server 30) to check whether the data processing program has been actually operated, and therefore the execution log is highly convenient.

(III) Supplementary Notes

The following supplementary notes are further disclosed with respect to the above-described embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
   receive personal data related to a personal data originator;
   set program identification information to a data processing program for processing the personal data uniquely;
   store a plurality of types of processing programs;
   manage the program identification information and the plurality of types of data processing programs in association with one another;
   receive, when the personal data is received, program identification information of the processing program which are selected by the personal data originator by presenting the plurality of types of data processing programs to the personal data originator as agreement information on a processing method for the personal data agreed between the personal data originator and a personal data user who uses the personal data;
   process the personal data by executing a processing program which corresponds to the agreement information and included in the processing programs;
   attach a digital signature to processed data; and
   output the processed data with the attached digital signature.

2. The information processing apparatus according to claim 1, wherein the processor is configured to: verify validity of the received personal data; and when the validity of the personal data is confirmed as a result of verification, process the personal data.

3. The information processing apparatus according to claim 1, wherein the processor is configured to:
   create an electronic certificate for the processed data with the attached digital signature;
   attach the electronic certificate to the processed data with the attached digital signature; and
   output the processed data with the attached electronic certificate and digital signature.

4. The information processing apparatus according to claim 1, wherein the processor is configured to transmit the processed data with the attached digital signature to a second information processing apparatus that the personal data originator uses, and the second information processing apparatus transmits the processed data with the attached digital signature to a third information processing apparatus configured to perform processing by using the processed data with the attached digital signature.

5. The information processing apparatus according to claim 1, wherein the processor is configured to:
   store the processed data in a storage device; and
   issue a first ticket including first access information for accessing the processed data stored in the storage device, and a third information processing apparatus acquires the processed data from the storage device by using the first access information of the first ticket.

6. The information processing apparatus according to claim 1, wherein the processor is configured to:
   store the personal data in the memory;
   receive a second ticket including second access information for accessing the personal data stored in the memory; and
   acquire, from the memory, the personal data by using the second access information of the second ticket.

7. A non-transitory computer-readable recording medium recording a control program for causing a computer to execute a process, the process comprising:
   receiving personal data related to a personal data originator;
   setting program identification information to a data processing program for processing the personal data uniquely;
   storing a plurality of types of processing programs;
   managing the program identification information and the plurality of types of data processing programs in association with one another;
   receiving, when the personal data is received, program identification information of the processing program which are selected by the personal data originator by presenting the plurality of types of data processing programs to the personal data originator as agreement information on a processing method for the personal data agreed between the personal data originator and a personal data user who uses the personal data;
   processing the personal data by executing a processing program which corresponds to the agreement information and included in the processing programs;
   attaching a digital signature to processed data created by the processing; and
   outputting the processed data with the attached digital signature.

8. The non-transitory computer-readable recording medium according to claim 7 for causing the computer to further execute the process comprising:
   verifying validity of the received personal data; and
   processing the personal data when the validity of the personal data is confirmed as a result of verification.

9. The non-transitory computer-readable recording medium according to claim 7 for causing the computer to further execute the process comprising:
   creating an electronic certificate for the processed data with the attached digital signature;
   attaching the electronic certificate to the processed data with the attached digital signature; and
   outputting the processed data with the attached electronic certificate and digital signature.

10. The non-transitory computer-readable recording medium according to claim 8 for causing the computer to further execute the process comprising:
   transmitting the processed data with the attached digital signature to a second information processing apparatus that the personal data originator uses; and
   transmitting the processed data with the attached digital signature from the second information processing apparatus to a third information processing apparatus configured to perform processing by using the processed data.

11. The non-transitory computer-readable recording medium according to claim 7 for causing the computer to further execute the process comprising:
   storing the processed data in a storage device; issuing a first ticket including first access information for accessing the processed data stored in the storage device; and
   making a third information processing apparatus acquire the processed data from the storage device by using the first access information of the first ticket.

12. The non-transitory computer-readable recording medium according to claim 8 for causing the computer to further execute the process comprising:
   storing the personal data in a memory; receiving a second ticket including second access information for accessing the personal data stored in the memory; and
   acquiring the personal data from the memory by using the second access information of the second ticket.

13. A control method comprising:
   receiving, by computer, personal data related to a personal data originator;
   setting program identification information to a data processing program for processing the personal data uniquely;
   storing a plurality of types of processing programs;
   managing the program identification information and the plurality of types of data processing programs in association with one another;
   receiving, when the personal data is received, program identification information of the processing program which are selected by the personal data originator by presenting the plurality of types of data processing programs to the personal data originator as agreement information on a processing method for the personal data agreed between the personal data originator and a personal data user who uses the personal data;
   processing the personal data by executing a processing program which corresponds to the agreement information and included in the processing programs;
   attaching a digital signature to processed data created by the processing; and
   outputting the processed data with the attached digital signature.

14. The control method according to claim 13, further comprising:
   verifying validity of the received personal data; and
   processing the personal data when the validity of the personal data is confirmed as a result of the verification.

15. The control method according to claim 13, further comprising:
   creating an electronic certificate for the processed data with the attached digital signature,
   wherein the electronic certificate is attached to the processed data with the attached digital signature, and then the processed data with the attached electronic certificate and digital signature is output.

16. The control method according to claim 13, further comprising:

> transmitting the processed data with the attached digital signature to a second information processing apparatus that the personal data originator uses; and
>
> transmitting the processed data with the attached digital signature from the second information processing apparatus to a third information processing apparatus configured to perform processing by using the processed data.

17. The control method according to claim 13, further comprising:

> storing the processed data in a storage device; and
>
> issuing a first ticket including first access information for accessing the processed data stored in the storage device,
>
> wherein a third information processing apparatus acquires the processed data from the storage device by using the first access information of the first ticket.

\* \* \* \* \*